(12) United States Patent  
Hirasago

(10) Patent No.: US 6,658,344 B2
(45) Date of Patent: Dec. 2, 2003

(54) VEHICLE TRAVELING CONTROL SYSTEM WITH STATE DISPLAY APPARATUS

(75) Inventor: Kiyomi Hirasago, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 97 days.

(21) Appl. No.: 10/075,614

(22) Filed: Feb. 15, 2002

(65) Prior Publication Data

US 2002/0133285 A1 Sep. 19, 2002

(30) Foreign Application Priority Data

Mar. 19, 2001 (JP) ........................................ 2001-078370

(51) Int. Cl.7 .............................................. B60K 31/00
(52) U.S. Cl. ............................ 701/96; 701/93; 180/170
(58) Field of Search ................................ 701/96, 93, 53, 701/301; 180/170; 340/425.5; 123/349, 319; 116/62.3

(56) References Cited

U.S. PATENT DOCUMENTS 5,838,259 A * 11/1998 Tonkin ........................ 340/903
6,133,852 A * 10/2000 Tonkin ........................ 340/903
6,226,588 B1 * 5/2001 Teramura et al. ............. 701/93

FOREIGN PATENT DOCUMENTS

| JP | 8-192663 | 7/1996 |
|---|---|---|
| JP | 9-50582 | 2/1997 |

* cited by examiner

Primary Examiner—William A. Cuchlinski, Jr.
Assistant Examiner—Olga Hernandez
(74) Attorney, Agent, or Firm—Foley & Lardner

(57) ABSTRACT

A traveling control system with a state display apparatus is comprised of a speed range display disposed along a scale of a speedometer and a controller coupled with the speed range display. The controller commands the speed range display to display a set-condition speed range indicative that it is possible to set a vehicle traveling control, when the vehicle traveling control by the vehicle traveling control system is not set. The controller commands the speed range display to display a control-condition speed range indicative that it is possible to continue the vehicle traveling control, when the vehicle traveling control is set.

13 Claims, 28 Drawing Sheets

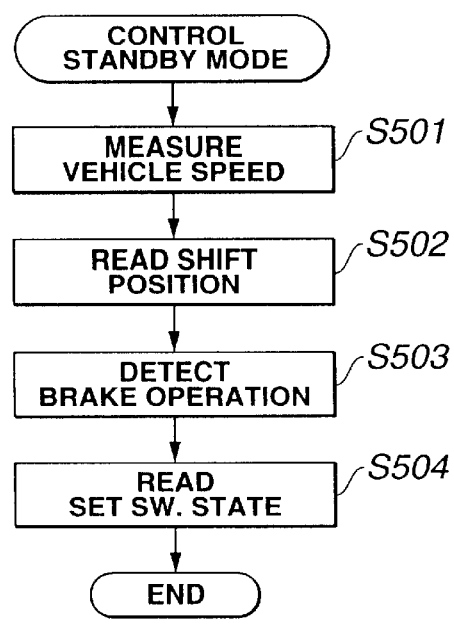
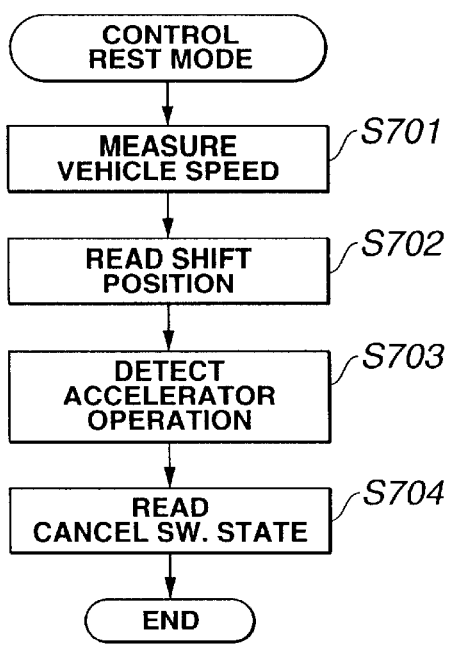
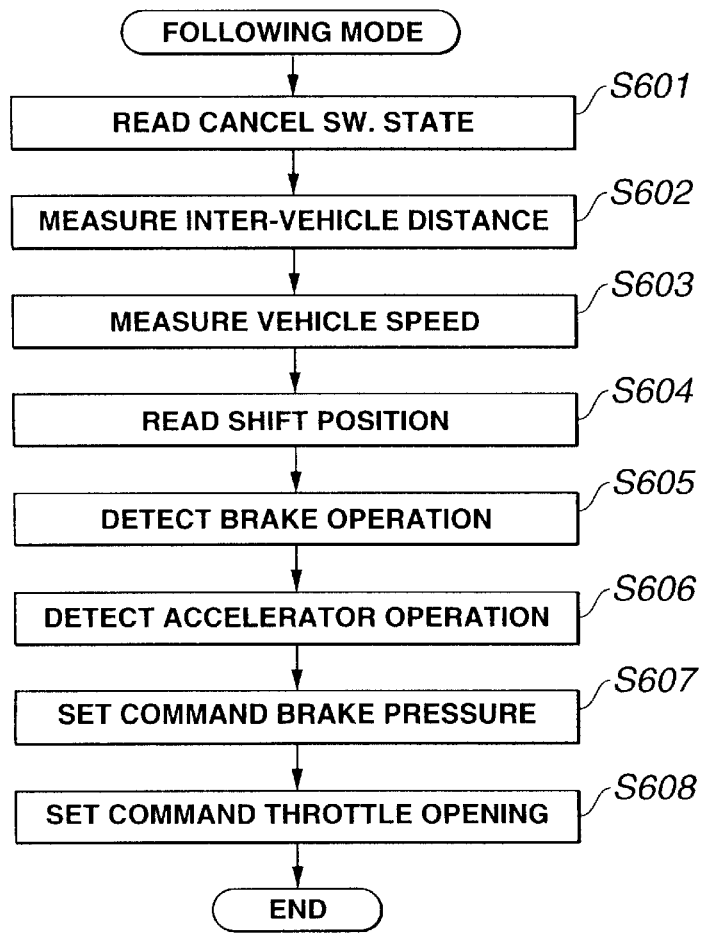

**MAIN SW. OFF STATE
(NO SPEED RANGE
IS DISPLAYED)**

**NON-CONTROL STATE
(SET-CONDITION SPEED
RANGE : 48~110km/h)**

**CONTROL SET STATE
(CONTROL-CONDITION
SPEED RANGE : 38~120km/h)**

FIG.20

| NON-CONTROLLED STATE | HIGH-SPEED CONTROL STATE | LOW-SPEED CONTROL STATE |
|---|---|---|
| DISPLAY SET-CONDITION SPEED RANGE | CHANGE DISPLAY APPEARANCE OF CONTROL-CONDITION SPEED RANGE IN HIGH SPEED RANGE | CHANGE DISPLAY APPEARANCE OF CONTROL-CONDITION SPEED RANGE IN LOW SPEED RANGE |

FIG.22

| | NON-CONTROLLED STATE | HIGH-SPEED CONTROL STATE | LOW-SPEED CONTROL STATE |
|---|---|---|---|
| | DISPLAY SET-CONDITION SPEED RANGE | CHANGE DISPLAY APPEARANCE OF CONTROL-CONDITION SPEED RANGE IN HIGH SPEED RANGE | CHANGE DISPLAY APPEARANCE OF CONTROL-CONDITION SPEED RANGE IN LOW SPEED RANGE |
| SPEED RANGE DISPLAY | | | |
| STEADY-STATE INFORMATION DISPLAY | | | |

VEHICLE TRAVELING CONTROL SYSTEM WITH STATE DISPLAY APPARATUS

BACKGROUND OF THE INVENTION

The present invention relates to a vehicle traveling control system with a state display apparatus which system executes a constant-speed cruise control for keeping a vehicle speed at a set speed, a following control for following a preceding vehicle ahead of a host vehicle while keeping an inter-vehicle predetermined distance, a lane-keeping control for keeping the host vehicle within a traveling lane, and a combination of these controls.

Japanese Patent Application First Publication No. Heisei 8-192663 discloses a display device which displays information as to a set vehicle speed, an inter-vehicle distance, an existence of a preceding vehicle and an approach to the preceding vehicle so that a driver can recognize a control state of the host vehicle.

SUMMARY OF THE INVENTION

However, such a display device does not display a set-condition speed range within which it is possible to execute a setting operation of the traveling control, and a control-condition speed range within which it is possible to continue the traveling control. Therefore, a driver has been requested to remember the set-condition speed range and the control condition speed range.

It is therefore an object of the present invention to provide a traveling control system with a state display apparatus which enables a driver to easily compare a present vehicle speed with a set-condition speed range and a control-condition speed range.

According to the present invention, a vehicle traveling control system comprising: a control setting unit for setting a vehicle traveling control; a speed range display disposed along a scale of a speedometer; a controller coupled with the control setting unit and the speed range display, the controller being arranged to execute the vehicle traveling control according to a setting operation of the control setting unit, to command the speed range display to display a set-condition speed range wherein a setting of the vehicle traveling control is allowed when the vehicle traveling control is not set, and to command the speed range display to display a control-condition speed range wherein a continuation of the vehicle traveling control is allowed when the vehicle traveling control is set.

According to the present invention, a vehicle traveling control system with a state display apparatus, comprising: a control setting unit for setting a vehicle traveling control; a speed-range display disposed along a scale of a speedometer of a host vehicle; a controller executing the vehicle traveling control according to a setting operation of the control setting unit; the controller executing an inter-vehicle distance control for following a preceding vehicle so that an inter-vehicle distance between the preceding vehicle and the host vehicle is brought closer to a target inter-vehicle distance while a vehicle speed is maintained within a target vehicle speed when the vehicle traveling control is executed and when there is the preceding vehicle ahead of the host vehicle; the controller executing a cruise control so that a vehicle speed of the host vehicle is brought closer to a set vehicle speed set by the control setting unit when the vehicle traveling control is executed and when there is no preceding vehicle ahead of the host vehicle; the controller commanding the speed-range display to display a first speed range indicative of a setting enabling range when the vehicle traveling control is not set; the controller commanding the speed-range display to display a second speed range indicative of a variable range of a set vehicle speed when the vehicle traveling control is set; the controller commanding the speed-range display to display a third speed range indicative of an upper-extended control continued range when the vehicle traveling control is set and when the vehicle speed is greater than the set vehicle speed due to a vehicle accelerating operation by a driver; the controller commanding the speed-range display to change a displayed speed range from the third speed range to the second speed range when the vehicle accelerating operation by the driver is terminated and when the vehicle speed is smaller than a maximum value of the variable range of the set vehicle speed; the controller commanding the speed-range display to display a fourth speed range indicative of a lower-extended control continued range when the inter-vehicle distance control is executed and when vehicle speed is smaller than a first predetermined value; and the controller commanding the speed-range display to change the displayed speed range from the fourth speed range to the second speed range when the vehicle speed is greater than a second predetermined value which is greater than the first predetermined value.

A state display apparatus according to the present invention, of a vehicle traveling control system, comprising: a speed range display disposed along a scale of a speedometer; a controller coupled with the speed range display, the controller being arranged to command the speed range display to display a set-condition speed range wherein a setting of the vehicle traveling control is allowed, when a vehicle traveling control by the vehicle traveling control system is not set, and to command the speed range display to display a control-condition speed range wherein a continuation of the vehicle traveling control is allowed, when the vehicle traveling control is set.

According to the present invention, a method of displaying a state of a vehicle traveling control, comprising: displaying a first speed range indicative of a traveling control settable speed range when the vehicle traveling control is not set; and displaying a second speed range indicative of a traveling control maintainable speed range when the vehicle traveling control is set.

The other objects and features of this invention will become understood from the following description with reference to the accompanying drawings.

BRIEF DESCRIPTION OF THE DRAWINGS

FIG. 6A is a flowchart showing a control process during a control standby mode in the first embodiment, FIG. 6B is a flowchart showing a control process during a following mode in the first embodiment, and FIG. 6C is a flowchart showing a control process during a control rest mode in the first embodiment.

FIG. 20 is a view showing a content of a displayed speed range by each state in the fourth embodiment.

FIG. 22 is a view showing a content of a displayed speed range by each state in a sixth embodiment.

DETAILED DESCRIPTION OF THE INVENTION

FIRST EMBODIMENT

Referring to FIGS. 1 to 12, there is shown a first embodiment of a vehicle traveling control system with a state display apparatus according to the present invention.

Figure 1:
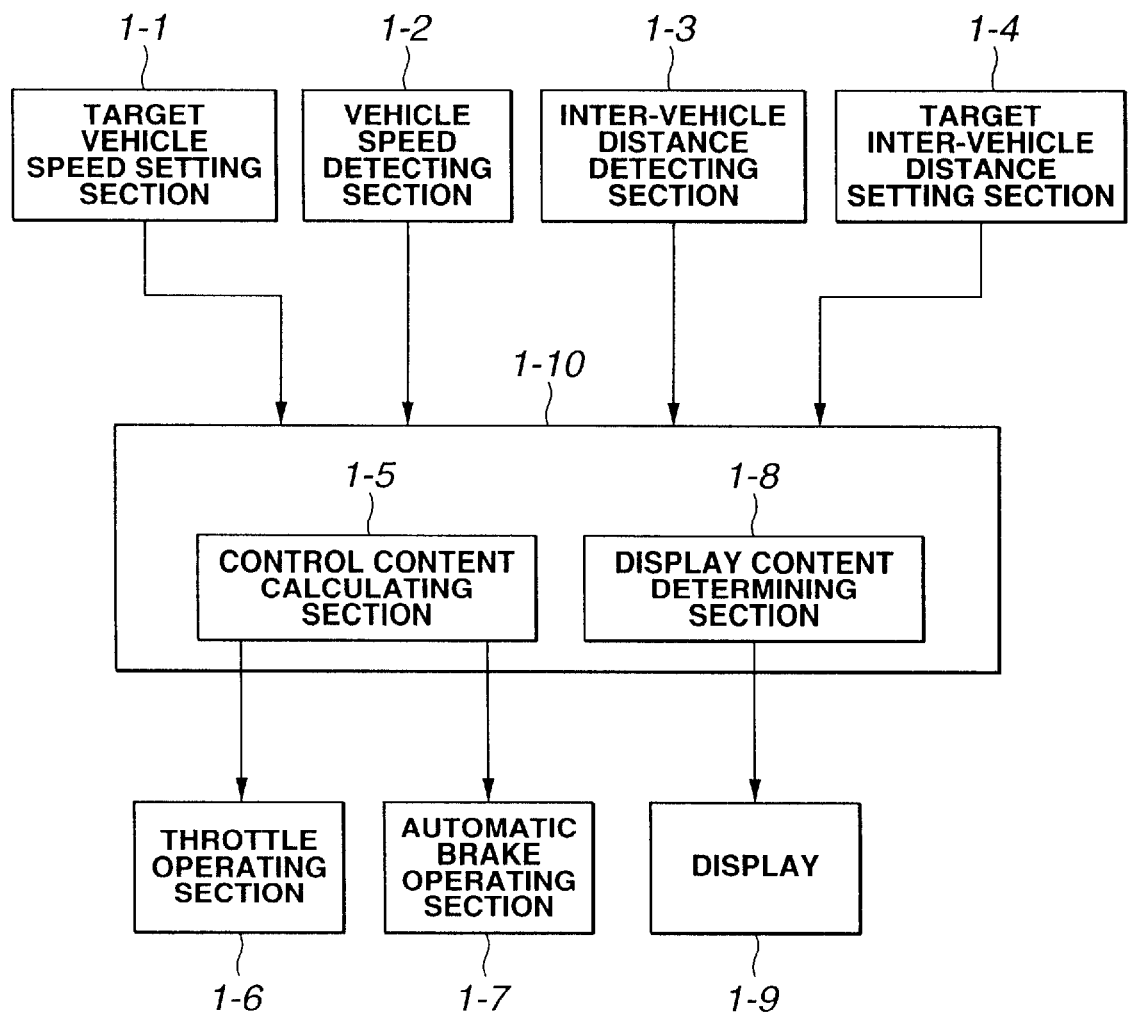
FIG. 1 is a schematic diagram showing a vehicle traveling control system of a first embodiment according to the present invention.

As schematically shown in FIG. 1, the vehicle traveling control system for a vehicle in according with the present invention comprises a target vehicle speed setting section 1—1, a vehicle speed detecting section 1-2, an inter-vehicle distance detecting section 1-3, a target inter-vehicle distance setting section 1-4, a-control content calculating section 1-5, a throttle operating section 1-6, an automatic brake operating section 1-7, a display content determining section 1-8, a display 1-9 and a traveling control section 1-10 which includes control content calculating section 1-5 and display content determining section 1-8.

Target vehicle speed setting section 1—1 sets a target vehicle speed. When there is a preceding vehicle ahead of a host vehicle, the vehicle traveling control system executes a following control so that the vehicle speed does not becomes greater than the target vehicle speed. When there is no preceding vehicle ahead of the host vehicle, the vehicle traveling control system executes a cruise control so as to bring the vehicle speed closer to the target vehicle speed. Vehicle speed detecting section 1-2 detects the vehicle speed of the host vehicle. The vehicle speed is calculated from one of a revolution speed of an output shaft of a transmission and a revolution speed of one of wheels. Inter-vehicle distance detecting section 1-3 detects an inter-vehicle distance between the host vehicle and the preceding vehicle, and includes a laser radar, a millimeter wave radar and a stereo camera. Target inter-vehicle distance setting section 1-4 sets a target inter-vehicle distance on the basis of a vehicle speed of the host vehicle. Control content calculating section 1-5 calculates a command brake hydraulic pressure and a command throttle opening so as to bring the detected inter-vehicle distance closed to the target inter-vehicle distance. Throttle operating section 1-6 controls a throttle so as to bring an actual throttle opening closer to the command throttle opening. Automatic brake operating section 1-7 controls brake hydraulic pressure so as to bring an actual brake hydraulic pressure closer to the command hydraulic pressure. Display content determining section 1-8 determines displayed content for informing control information to a driver. Display 1-9 displays the contented determined by display content determining section 1-8.

Figure 2:
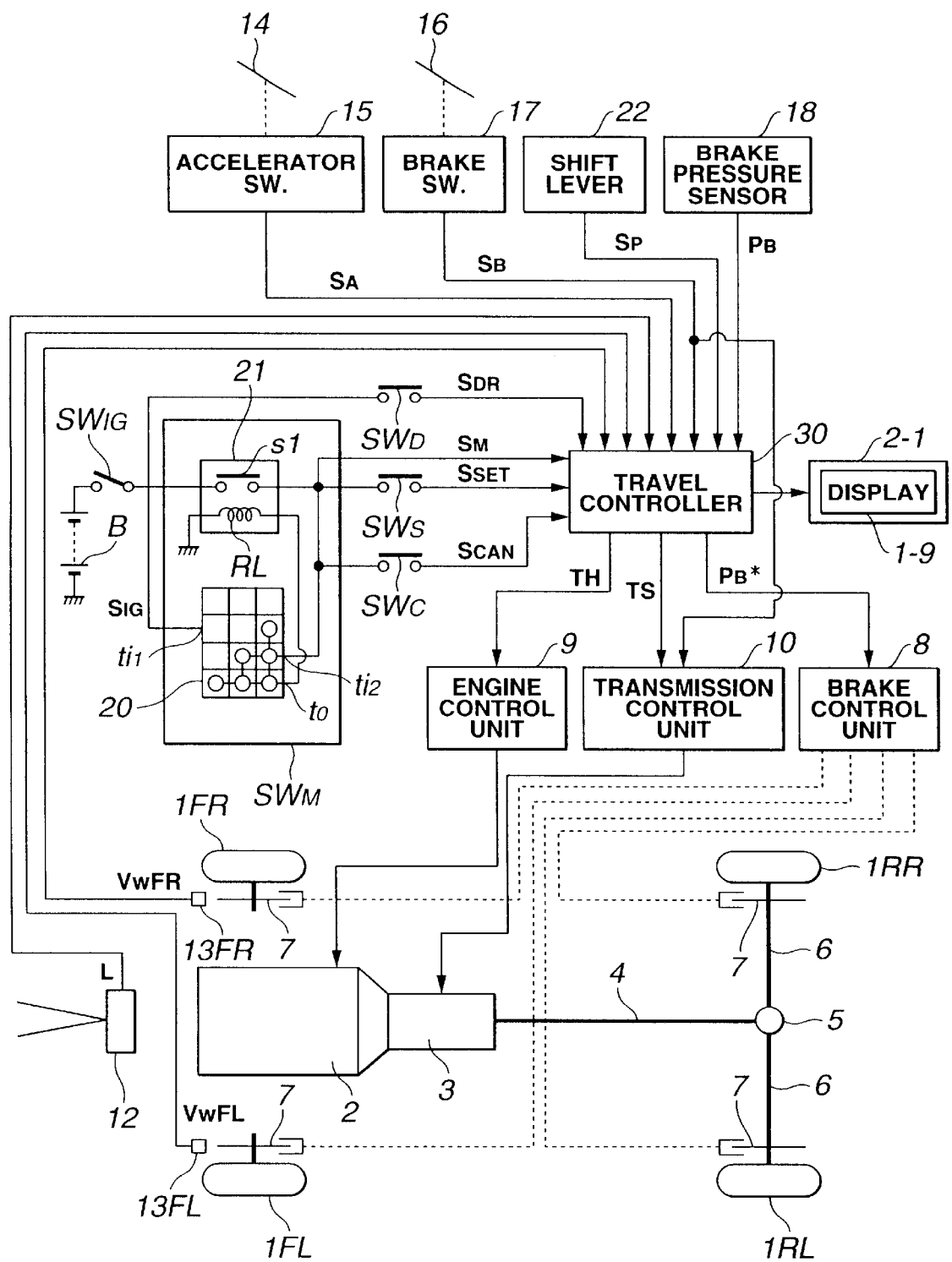
FIG. 2 is a view showing a whole system of the vehicle traveling system of the first embodiment.

FIG. 2 shows a total system of a vehicle traveling control system of a first embodiment according to the present invention. As shown in FIG. 2, the host vehicle equipped with the vehicle traveling control system has a pair of front wheels 1FL and 1FR acting as driven (following) wheels and a pair of rear wheels 1RL and 1RR acting as driving wheels. Rear wheels 1RL and 1RR are driven by driving force which is generated by an internal combustion engine 2 and which is transmitted to rear wheels 1RL and 1RR through an automatic transmission 3, a propeller shaft 4, a final reduction gear 5 and an axle 6.

A disc brake 7 is provided on each of front and rear wheels 1FL, 1FR, 1RL and 1RR. A brake control unit 8, which corresponds to automatic brake operating section 1-7, controls brake hydraulic pressure applied to each disc brake 7. Brake control unit 8 is arranged to generate the brake hydraulic pressure according to a depression degree of brake pedal 16 and to generate the brake hydraulic pressure according to a target brake pressure PB* sent from traveling controller 30.

An engine output control unit 9 is installed in engine 2 and controls an output of engine 2. Engine output control unit 9 functions as throttle operating section 1-6. Engine output control unit 9 controls the output of engine 2 by controlling an opening TH of a throttle valve of engine 2. Engine output control unit 9 may employ a method of controlling an idling speed of engine 2 by controlling an opening of an idle control valve, instead of the method of controlling the opening TH.

Automatic transmission 3 is coupled to a transmission control unit 10 for controlling a transmission ratio of automatic transmission 3. Transmission control unit 10 executes an upshift control or a downshift control for changing the transmission ratio of automatic transmission 3 according to an up/down shift command TS outputted from traveling controller 30. Transmission control unit 10 selects a desired transmission ratio of forward/backward running, neutral position and parking position of automatic transmission 3 according to a shift position signal Sp outputted from a shift lever 22.

On the other hand, an inter-vehicle distance sensor 12, which function as inter-vehicle distance detecting section 1-3, is disposed at a front and lower portion of a vehicle body of the vehicle. Inter-vehicle distance sensor 12 is of a radar type which scans laser beams and receives a reflection beam reflected from a preceding vehicle. That is, this functions as a preceding vehicle recognizing means. A millimeter wave radar and a stereo camera may be employed individually or in parallel as inter-vehicle distance sensor 12 instead of the laser radar. Further, the inter-vehicle distance may be obtained from an image processing of image data obtained by a single-eyed camera with reference to base data obtained by a laser radar or a millimeter wave radar.

Vehicle wheel speed sensors 13FL and 13FR are installed near front wheels 1FL and 1FR of the vehicle and functions as vehicle speed detecting section 1-2. An accelerator switch 15 is disposed near an accelerator pedal 14 and detects a depression of accelerator pedal 14. A brake switch 17 is disposed near a brake pedal 16 and detects a depression of brake pedal 16. A brake hydraulic pressure sensor 18 detects the brake hydraulic pressure outputted from brake controller 8. A shift lever 22 indicates a shift position selected by a driver.

The vehicle traveling control system further comprises a control panel in which there are provided with a main switch $SW_M$ and a set switch $SW_S$ through which a following control is selected, a cancel switch $SW_C$ for commanding a cancellation of the following control and a driving range detecting switch $SW_D$ for detecting that a select lever is set at a drive range (D range). Set switch $SW_S$ corresponds to target vehicle speed setting section 1—1 and target inter-vehicle distance setting section 1-4.

By properly setting set switch $SW_S$, cancel switch $SW_C$ and drive-range detecting switch $SW_D$, the mode change is commanded to traveling controller 30

Main switch $SW_M$ is connected to a battery B through an ignition switch $SW_{IG}$ and comprises a selector switch 20 of a momentary type and a relay circuit 21 of a self-hold type. Selector switch 20 is manually operated by a driver. When selector switch 20 is set at OFF state, a first input terminal $t_{i1}$ receiving a switch signal $SI_G$ is electrically shut off from an output terminal $t_o$. When selector switch 20 is set at a neutral state, a second input terminal $t_{i2}$ receiving electric power from relay circuit 21 is electrically connected with output terminal $t_o$. When selector switch 20 is set at ON state, both of first and second input terminals $t_{i1}$ and $t_{i2}$ are electrically connected with output terminal $t_o$.

Relay circuit 21 comprises a normal-open contact s1 and a relay coil RL for driving normal-open contact s1. One terminal of normal-open contact s1 is connected with ignition switch $SW_{IG}$, and the other terminal of normal-open contact s1 is connected with traveling controller 30 directly and through set switch $SW_S$. Further, the other terminal is connected with second input terminal $t_{i2}$ of selector switch 20. One terminal of relay coil RL is connected with output terminal to of selector switch 20, and the other terminal of relay coil RL is grounded.

Traveling controller 30 receives information signals from inter-vehicle distance sensor 12, wheel speed sensors 13FL and 13FR, accelerator switch 15, brake switch 17 and brake pressure sensor 18, respectively. Further, traveling controller 30 receives a shift position indicative signal Sp from shift lever and switch signals $S_M$, $S_{SET}$, $S_{CAN}$ and $S_{DR}$ from main switch $SW_M$, set switch $SW_S$, cancel switch $SW_C$ and drive range detecting switch $SW_D$, respectively.

Traveling controller 30 outputs a display command to display 1-9 integrally assembled with a meter panel 2-1 provided in a passenger compartment, in order to inform necessary information to the driver by displaying the information on display 1-9.

A construction of display 1-9 will be discussed with reference to FIGS. 3A to 3C.

Figure 3A:
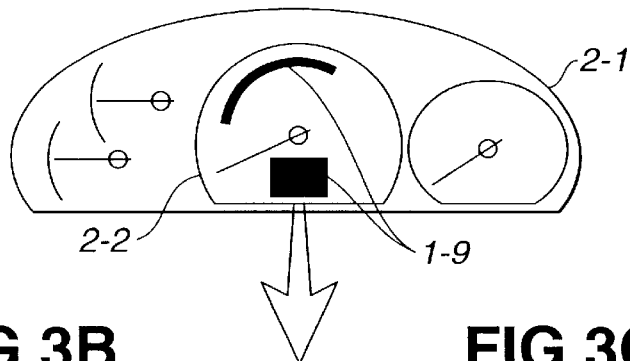
FIGS. 3A–3C are displays of a display section in the first embodiment.

Meter panel 2-1 comprises a speedometer 2—2 and display 1-9 installed in speedometer 2—2, as shown in FIG. 3A. Display 1-9 is disposed under a center shaft of a pointer of speedometer 2—2, and comprises a cruise control execution indicating lamp 1-91, a system abnormality warning lamp 1-92, a set vehicle speed display section 1-93, a set inter-vehicle distance display section 1-94 and a preceding vehicle display section 1-95 for displaying the existence of a preceding vehicle, as shown in FIG. 3B.

Figure 3B:
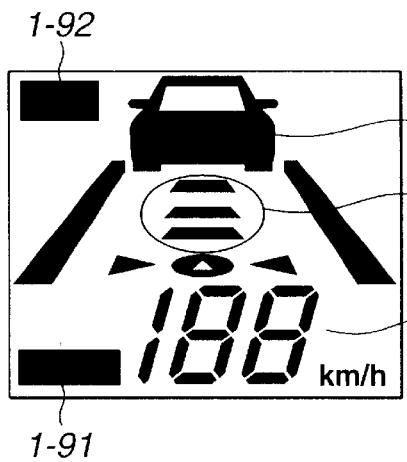
Figure 3C:
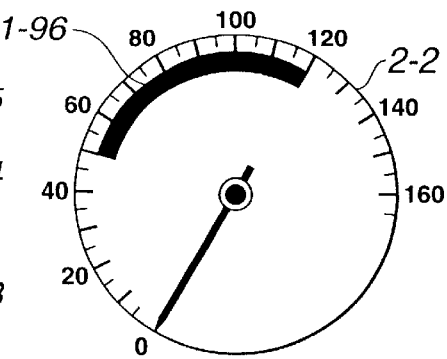

Display 1-9 comprises a speed range display section 1-96 which is disposed along a speed scale of analog-type speedometer 2—2 in a belt shape as shown in FIG. 3C. Speed range display section 1-96 is constituted by a luminous sheet or a plurality of LED's arranged along a scale of speedometer 2—2 so as to be able to display a speed range. A part or all of the speed range can be set at ON state and OFF state so that an area (vehicle speed range) set at ON state is varied according to whether a set condition ON state or a control condition ON state is selected.

Subsequently, the manner of operation of the display system of traveling control system will be discussed.

Mode Transition Operation

Figure 4:
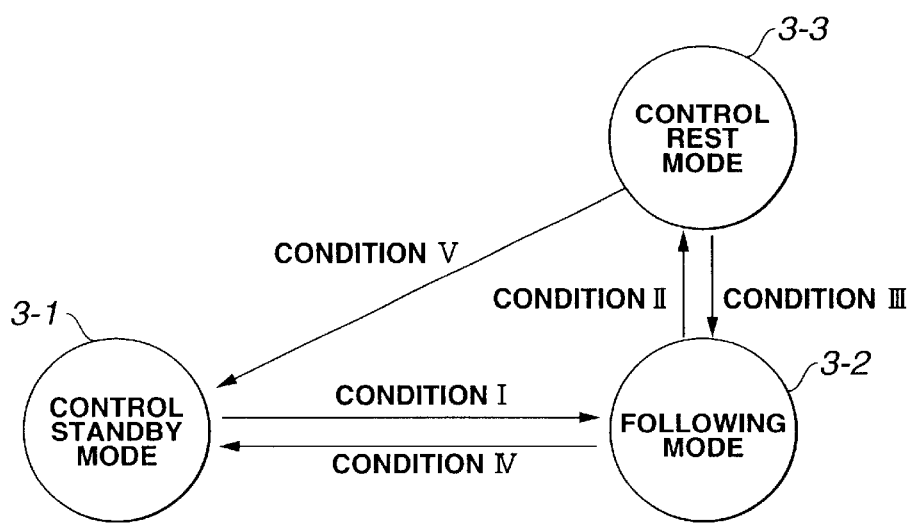
FIG. 4 is an explanatory view explaining a relationship of control modes and conditions.

FIG. 4 shows variations of mode transitions executed by the control content calculating section of traveling controller 30.

A control standby mode 3-1 is selected when main switch $SW_M$ is turned on from an OFF state.

When a following mode 3-2 is selected and when inter-vehicle distance sensor 12 detects a preceding vehicle, traveling controller 30 calculates a throttle opening command and a brake command so as to bring an actual inter-vehicle distance L closer to a target inter-vehicle distance L* set based on the vehicle condition including the vehicle speed, by a target inter-vehicle distance setting section as far as a vehicle speed of a host vehicle does not becomes over the target vehicle speed which is set by a driver through a target vehicle speed setting section.

When following mode 3-2 is selected and when no preceding vehicle exists ahead of the host vehicle, traveling controller 30 calculates the throttle opening command and the brake command so as to bring the actual vehicle speed closer to the set vehicle speed.

When control rest mode 3—3 is selected and when traveling controller 30 detects that the driver executes an acceleration operation during the following control (following mode), traveling controller 30 stops the control in the following mode so that the acceleration operation by the driver is executed by priority.

The transition among the above-mentioned three control modes is controlled according to the following transition conditions I through V.

Transition condition I is established when the host vehicle travels at a vehicle speed in D range within a predetermined speed range and when set switch $SW_S$ is turned on by the pushing operation of the driver. When transition condition I is satisfied, the control mode is transited from control standby mode 3-1 to following mode (control execution mode) 3-2.

Transition condition II is established when the host vehicle travels under following mode 3-2 and when accelerator pedal 14 is depressed by the driver. When the transition condition II is satisfied, the control mode is transited from following mode 3-2 to control rest mode 3—3.

Transition condition III is established when the host vehicle is accelerated by the depression of accelerator pedal 14 under control rest mode 3—3. when accelerator pedal 14 is released. When transition condition III is satisfied, the control mode is transited from control rest mode 3—3 to following mode 3-2.

Transition condition IV is established when the host vehicle travels under following mode 3-2 and when one of the turning on of cancel switch $SW_C$, the shifting operation and the increase of the depression degree of brake pedal is executed. When the transition condition IV is satisfied, the control mode is transited from following mode 3-2 to control rest mode 3-1.

Transition condition V is established when the host vehicle is accelerated by the depression of the accelerator pedal under control rest mode 3—3 and when one of the turning on of cancel switch $SW_C$, the shifting operation and the increase of the vehicle speed over a predetermined value is executed. When the transition condition V is satisfied, the control mode is transited from control rest mode 3—3 to control standby mode 3-1.

Traveling Control Process

Figure 5:
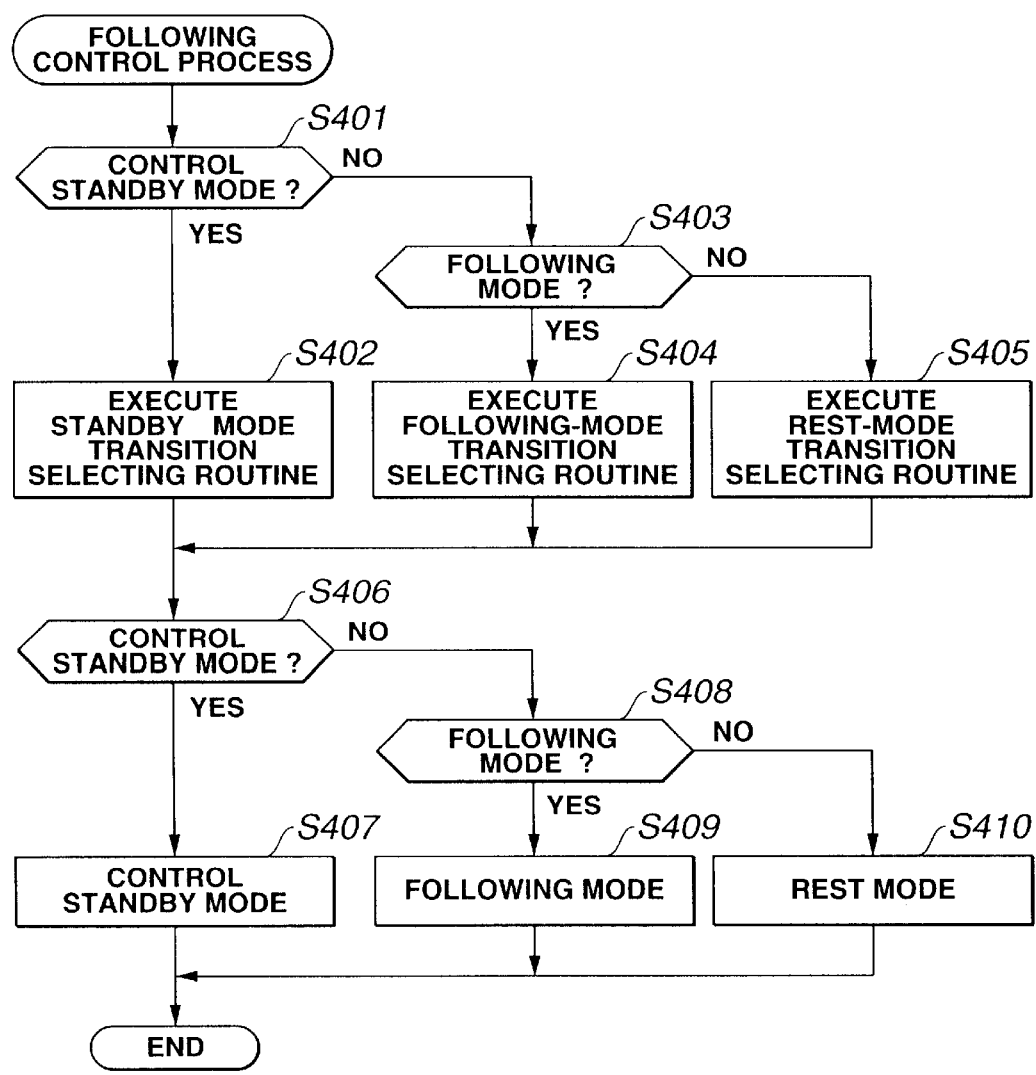
FIG. 5 is a flowchart showing a main routine of the traveling control process of the first embodiment.

FIG. 5 shows a flowchart of a following control process executed by control contend calculating section of traveling controller 30 as a main program.

At step S401, traveling controller 30 determines whether or not the control mode is a control standby mode. When the determination at step S401 is affirmative, the routine proceeds to step S402. When the determination at step S401 is negative, the routine proceeds to step S403.

At step S402, controller 30 executes a standby-mode transition selecting routine.

At step S403, controller 30 determines whether or not the following mode is selected. When the determination at step S403 is affirmative, the routine proceeds to step S404. When the determination at step S403 is negative, the routine proceeds to step S405.

At step S404, controller 30 executes a following-mode transition selecting routine.

At step S405, controller 30 executes a rest-mode transition selecting routine.

At step S406, controller 30 determines whether or not the control rest mode is selected. When the determination at step S406 is affirmative, the routine proceeds to step S407. When the determination at step S406 is negative, the routine proceeds to step S408.

At step S407, controller 30 executes a routine of the control standby mode, shown in FIG. 6A.

At step S408, controller 30 determines whether or not the following mode is selected. When the determination at step S408 is affirmative, the routine proceeds to step S409. When the determination at step S408 is negative, the routine proceeds to step S410.

At step S409, controller 30 executes a routine of the following mode (the control execution mode), shown in FIG. 6B.

At step S410, controller executes a routine of the control rest mode, shown in FIG. 6C.

The routine of the control standby mode will be discussed with reference to a flowchart of FIG. 6A.

At step S501, traveling controller 30 measures the actual vehicle speed.

At step S502, controller 30 reads the shift position.

At step S503, controller 30 detects the braking operation executed by the driver.

At step S504, controller 30 reads the state of set switch $SW_S$ by determining whether set switch $SW_S$ is turned on by the driver.

The routine of the following mode will be discussed with reference to a flowchart of FIG. 6B.

At step S601, traveling controller 30 reads the state of cancel switch $SW_C$ by determining whether the driver turns on cancel switch $SW_C$.

At step S602, controller 30 measures the actual inter-vehicle distance.

At step S603, controller 30 measures the actual vehicle speed.

At step S604, controller 30 reads the shift position.

At step S605, controller 30 detects the braking operation executed by the driver.

At step S606, controller 30 reads the accelerating operation executed by the driver.

At step S607, controller 30 sets a command brake pressure.

At step S608, controller 30 sets a command throttle opening.

The routine of the control rest mode will be discussed with reference to a flowchart of FIG. 6C.

At step S701, traveling controller 30 measures the actual vehicle speed.

At step S702, controller 30 reads the shift position.

At step S703, controller 30 detects the accelerating operation executed by the driver.

At step S704, controller 30 reads the state of cancel switch $SW_C$ by determining whether the driver turns on cancel switch $SW_C$.

Transition Selecting Process

Figure 7:
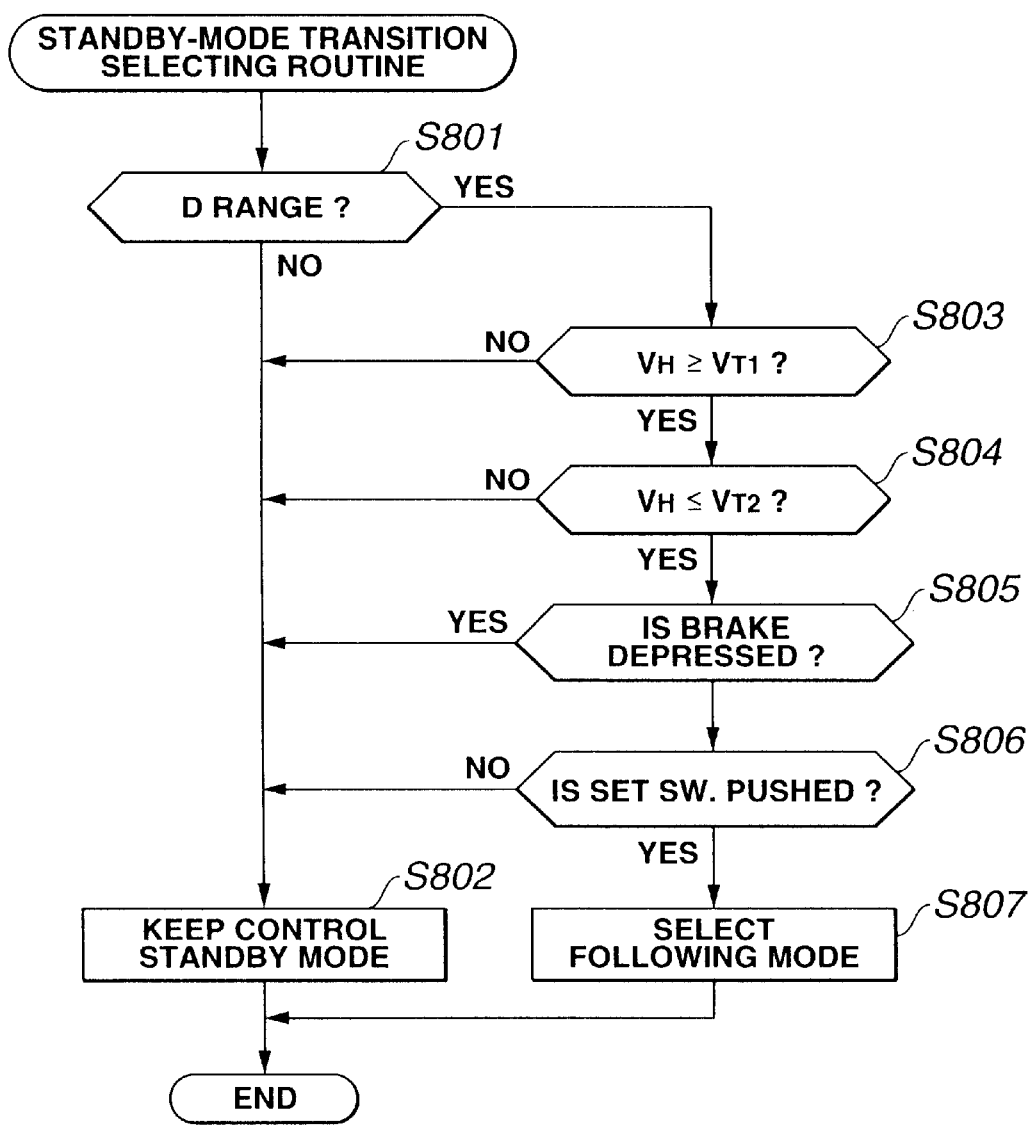
FIG. 7 is a flowchart showing a mode transition selecting process during the control standby mode in the first embodiment.

FIG. 7 shows a flowchart for determining a transited mode from the control standby mode.

At step S801, traveling controller 30 determines whether D range is selected or not. When the determination at step S801 is affirmative, the routine proceeds to step S803. When the determination at step S801 is negative, the routine proceeds to step S802.

At step S802, controller 30 terminates the present routine while maintaining the control standby mode.

At step S803, controller 30 determines whether vehicle speed $V_H$ is greater than or equal to a first threshold $V_{T1}$ such as 48 km/h. When the determination at step S803 is affirmative, the routine proceeds to step S804. When the determination at step S803 is negative, the routine proceeds to step S802.

At step S804, controller 30 determines whether vehicle speed $V_H$ is greater than or equal to a second threshold $V_{T2}$ such as 11 km/h. When the determination at step S804 is affirmative, the routine proceeds to step S805. When the determination at step S804 is negative, the routine proceeds to step S802.

At step S805, controller 30 determines whether or not the brake pedal is depressed by the driver. When the determination at step S805 is negative, the routine proceeds to step S806. When the determination at step S805 is affirmative, the routine proceeds to step S802.

At step S806, controller 30 determines whether or not set switch $SW_S$ is turned on by the driver. When the determination at step S806 is affirmative, the routine proceeds to step S807. When the determination at step S806 is negative, the routine proceeds to step S802.

At step S807, controller 30 changes the control mode from the control standby mode to the following mode. Then, controller 30 terminates the present routine of FIG. 6.

Figure 8:
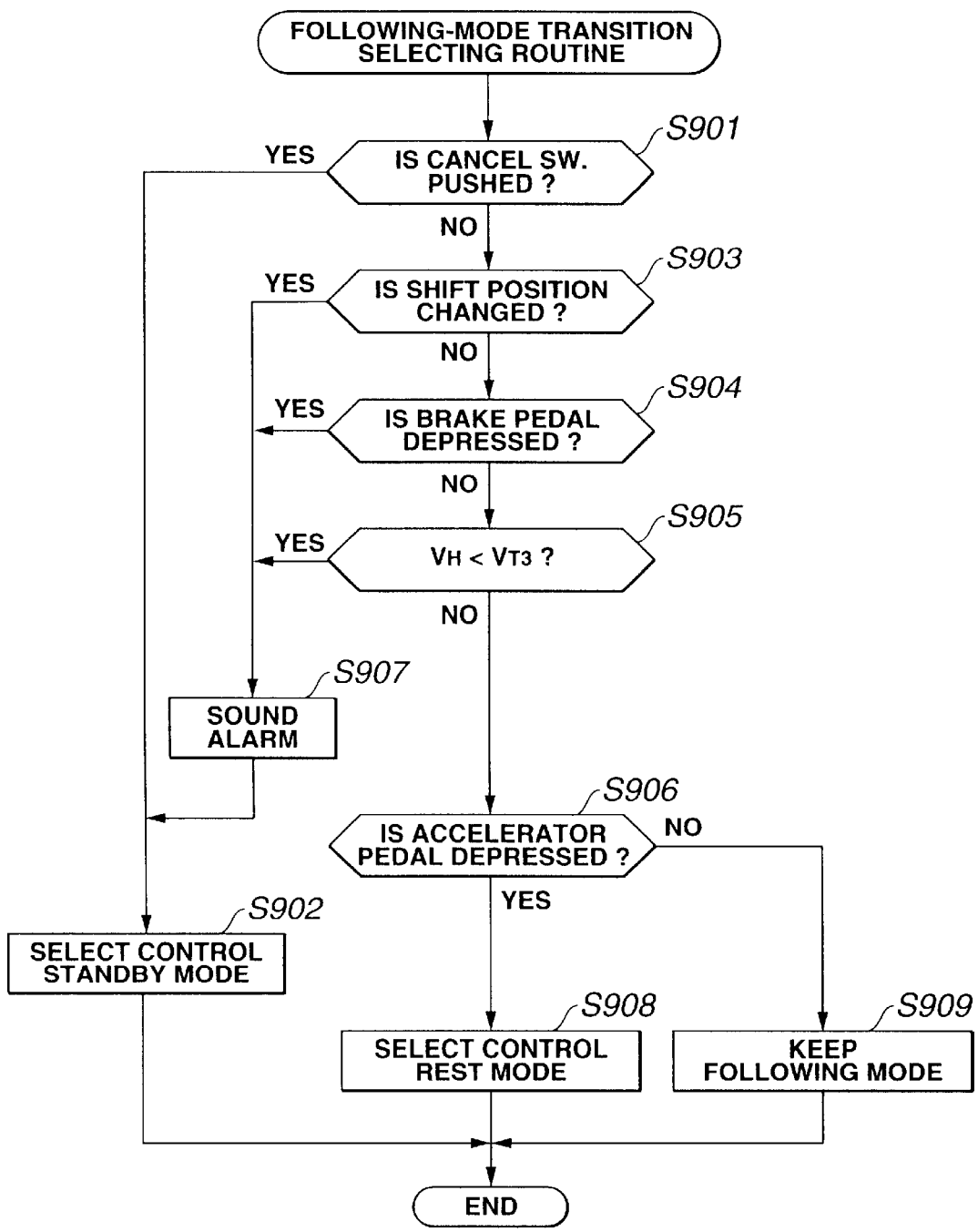
FIG. 8 is a flowchart showing a mode transition selecting process during the following mode in the first embodiment.

FIG. 8 shows a flowchart for determining a transited mode to be transited from the following mode.

At step S901, traveling controller 30 determines whether cancel switch $SW_C$ is pushed or not. When the determination at step S901 is affirmative, the routine proceeds to step S902. When the determination at step S901 is negative, the routine proceeds to step S903.

At step S902, controller 30 changes the control mode from the following mode to the control standby mode. Then, controller 30 terminates the present routine of FIG. 8.

At step S903, controller 30 determines whether or not the shift position is changed. When the determination at step S903 is affirmative, the routine proceeds to step S907. When the determination at step S903 is negative, the routine proceeds to step S904.

At step S904, controller 30 determines whether or not the brake is depressed by the driver. When the determination at step S904 is affirmative, the routine proceeds to step S907. When the determination at step S904 is negative, the routine proceeds to step S905.

At step S905, controller 30 determines whether or not the vehicle speed $V_H$ is smaller than or equal to a predetermined value $V_{T3}$ such as 38 km/h. When the determination at step S905 is affirmative, the routine proceeds to step S907. When the determination at step S905 is negative, the routine proceeds to step S906.

At step S906, controller 30 determines whether or not the driver is accelerating the host vehicle by increasing the depressing degree of the accelerator pedal. When the determination at step S906 is affirmative, the routine proceeds to step S908. When the determination at step S906 is negative, the routine proceeds to step S909.

At step S907, controller 30 alarms the driver that the control mode is changed from the following mode to the control standby mode due to the condition change determined at one of steps S903, S904 and S905. Then, the routine proceeds to step S902.

At step S908, controller 30 changes the control mode from the following mode to the control rest mode. Then, controller 30 terminates the present routine of FIG. 8.

At step S909, controller 30 maintains the following mode. Then, controller 30 terminates the present routine of FIG. 8.

Figure 9:
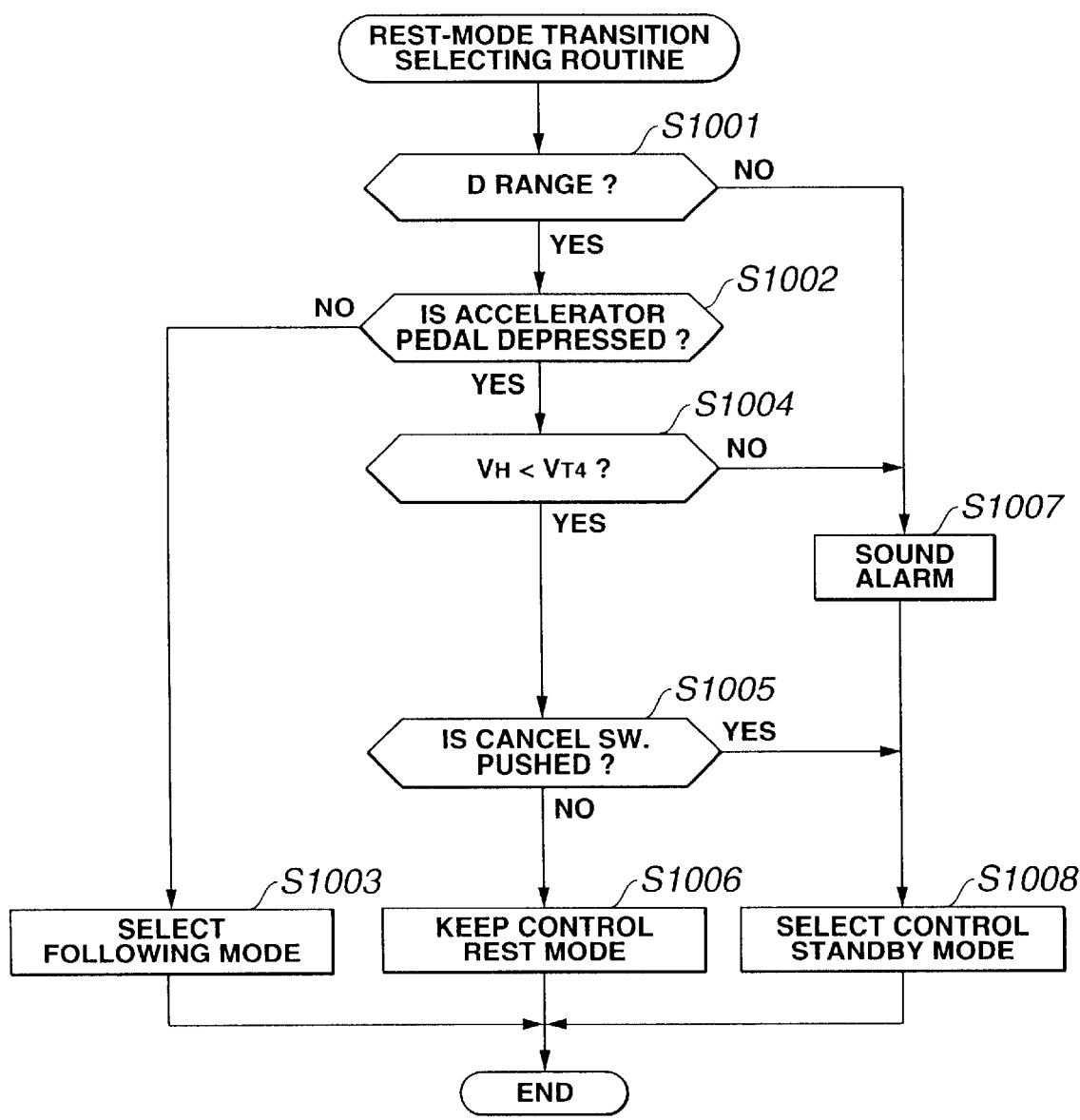
FIG. 9 is a flowchart showing a mode transition selecting process during the control rest mode in the first embodiment.

FIG. 9 shows a flowchart for determining a transited mode to be transited from the control rest mode.

At step S1001, traveling controller 30 determines whether or not the D range is selected. When the determination at step S1001 is affirmative, the routine proceeds to step S1002. When the determination at step S1001 is negative, the routine proceeds to step S1007.

At step S1002, controller 30 determines whether or not the driver is depressing accelerator pedal 14. When the determination at step S1002 is negative, the routine proceeds to step S1003. When the determination at step 1002 is affirmative, the routine proceeds to step S1004.

At step S1003, controller 30 changes the control mode from the control rest mode to the following mode. Then, controller 30 terminates the present routine of FIG. 9.

At step S1004, controller 30 determines whether or not the vehicle speed is smaller than a predetermined value such as 120 km/h. When the determination at step S1004 is affirmative, the routine proceeds to step S1005. When the determination at step S1004 is negative, the routine proceeds to step S1007.

At step S1005, controller 30 determines whether or not the cancel switch is pushed. When the determination at step S1005 is affirmative, the routine proceeds to step S1008. When the determination at step S1005 is negative, the routine proceeds to step S1006.

At step S1006, controller 30 maintains the control rest mode without changing to others. Then, control 30 terminates the present routine of FIG. 9.

At step S1007, controller 30 alarms the driver that the control mode is changed from the control rest mode to the control standby mode. Then, the routine proceeds to step S1008.

At step S1008, controller 30 changes the control mode from the control rest mode to the control standby mode. Then, controller 30 terminates the present routine of FIG. 9.

Steady-State Information Determining Process

Display content determining section 1-8 of traveling controller 30 determines the displayed content for informing the control condition to the driver concurrent with the execution of the processes shown in FIGS. 5 through 9. Such display content is displayed on display 1-9 assembled in speedometer 2—2 as shown in FIG. 3A.

Figure 10:
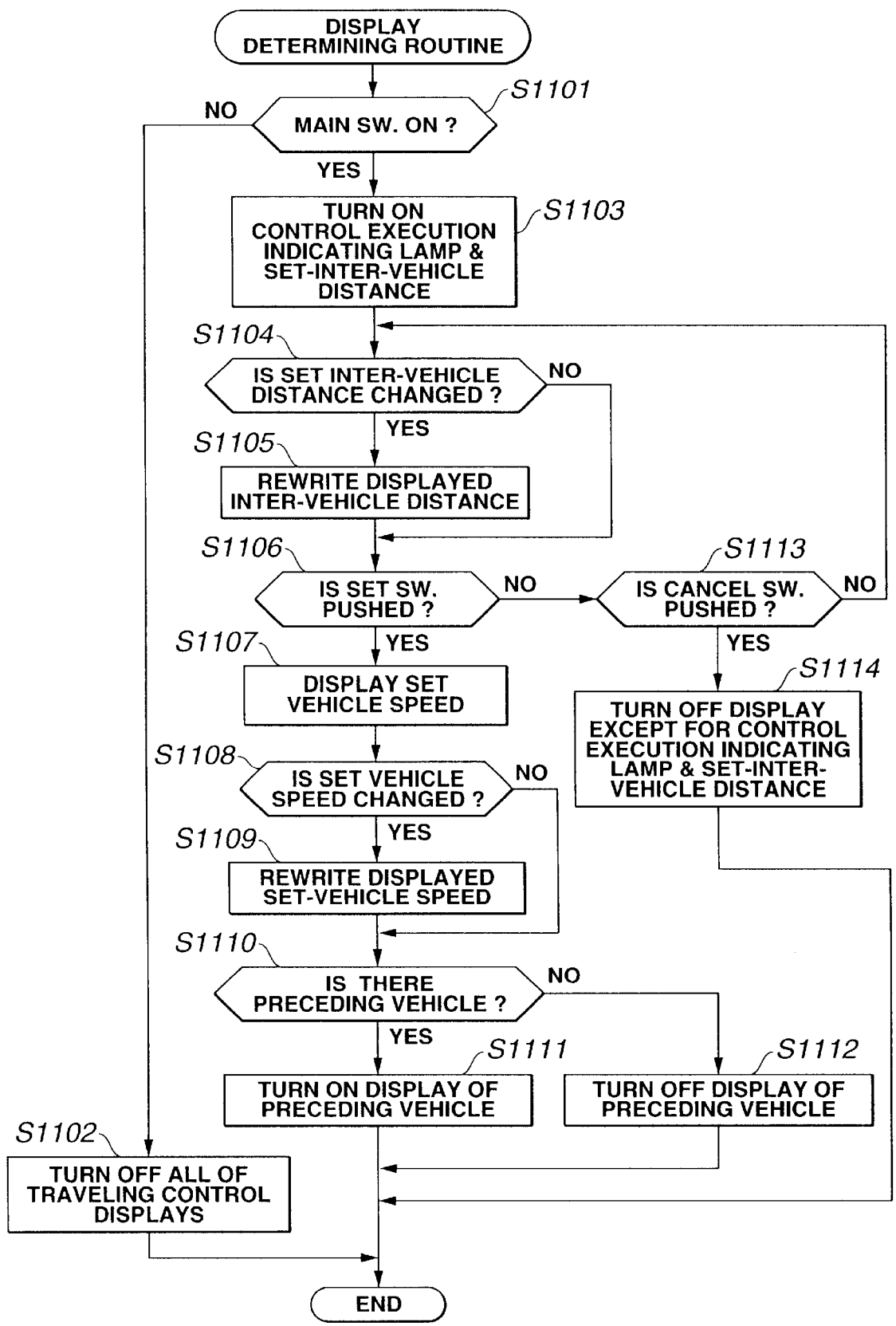
FIG. 10 is a flowchart showing a steady-state information display determining process of the first embodiment.

FIG. 10 shows a flowchart of a steady-state information determining process for determined a display content to be displayed on a cruise-control execution indicating lamp 1-91, a system abnormality warning lamp 1-92, a set-speed display section 1-93, a set inter-vehicle distance display section 1-94, a preceding-vehicle display section 1-95 shown in FIG. 3B.

At step S1101, traveling controller 30 determines whether main switch $SW_M$ is pushed (turned on) or not. When the determination at step S1101 is negative, the routine proceeds to step S1102. When the determination at step S1101 is affirmative, the routine proceeds to step S1103.

At step S1102, controller 30 turns off all of abnormality warning lamp 1-92, a set speed display section 1-93, a set inter-vehicle distance display section 1-94, a preceding vehicle display section 1-95. Then, controller 30 terminates the present routine of FIG. 10.

At step S1103, controller 30 turns on cruise-control execution indicating lamp 1-91 and inter-vehicle distance display section 1-94.

At step S1104, controller 30 determines whether the set inter-vehicle distance is changed or not. When the determination at step S1104 is affirmative, the routine proceeds to step S1105. When the determination at step S1104 is negative, the routine proceeds to step S1106.

At step S1105, controller 30 changes the displayed content of the set inter-vehicle distance display section 1-94 to the changed set inter-vehicle distance.

At step S1106, controller 30 determines whether set switch $SW_S$ is pushed or not. When the determination at step S1106 is affirmative, the routine proceeds to steps S1107. When the determination at step S1106 is negative, the routine proceeds to step S1113.

At step S1107, controller 30 displays the vehicle speed at the timing of pushing main switch $SW_S$ on set speed display section 1-93 as a set speed.

At step S1108, controller 30 determines whether set speed is changed or not. When the determination at step S1108 is affirmative, the routine proceeds to step S1109. When the determination at step S1108 is negative, the routine proceeds to steps S1110.

At steps S1109, controller 30 rewrites the set speed displayed on set speed display section 1-93 to the changed set speed.

At step S1110, controller 30 determines whether or not a preceding vehicle is recognized. When the determination at step S1110 is affirmative, the routine proceeds to step S1111. When the determination at step S1110 is negative, the routine proceeds to step S1112.

At step S1111, controller 30 turns on preceding vehicle display section 1-95. Then, controller 30 terminates the present routine of FIG. 10.

At step S1112, controller 30 turns off preceding vehicle display section 1-95. Then, controller 30 terminates the present routine of FIG. 10.

On the other hand, at step S1113 subsequent to the negative determination at step S1106, controller 30 determines whether cancel switch $SW_C$ is pushed or not. When the determination at step S1113 is affirmative, the routine proceeds to step S1114. When the determination at step S1113 is negative, the routine returns to step S1104.

At step S1114, controller 30 turns off all of system abnormality warning lamp 1-92, set speed display section 1-93 and preceding vehicle display section 1-95 except for cruise-control execution indicating lamp 1-91 and set inter-vehicle distance display section 1-94. Then, controller 30 terminates the present routine of FIG. 10.

Speed Range Determining Process

Figure 11:
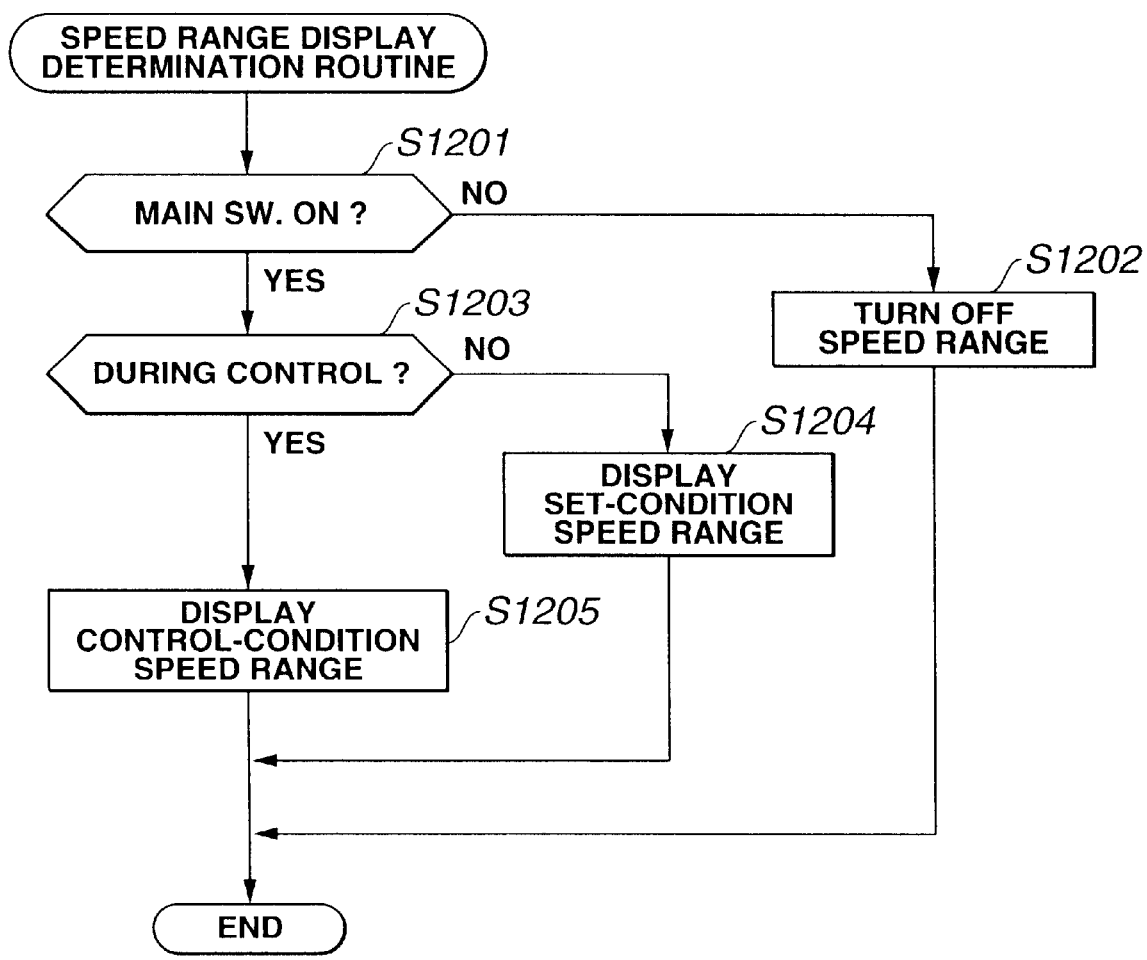
FIG. 11 is a flowchart showing a speed range display determining process of the first embodiment.
Figure 12A:
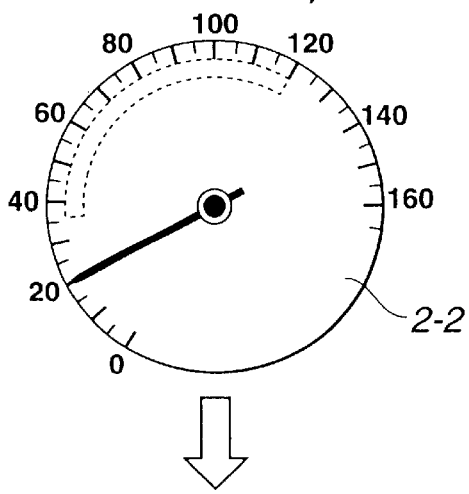
FIG. 12A is a view showing a speedometer on which no speed range is displayed in main-switch off state.
Figure 12B:
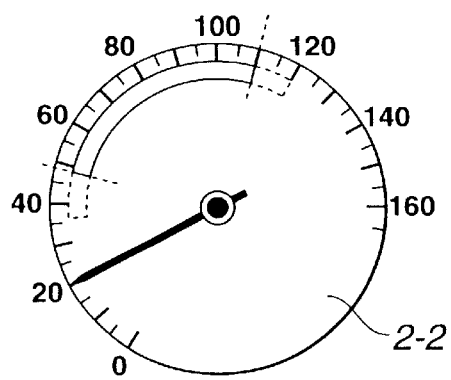
FIG. 12B is a view showing the speedometer on which a set-condition speed range is displayed in the non-control state.
Figure 12C:
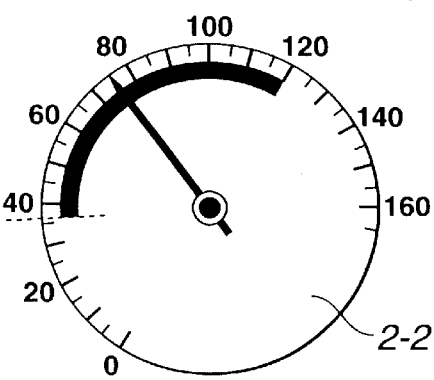
FIG. 12C is a view showing the speedometer on which a control-condition speed range is displayed in the control set state.

FIG. 11 shows a flowchart of a speed range display determining process for determining a speed range to be displayed on vehicle speed range display section 1-96.

At step S1201, traveling controller 30 determines whether main switch $SW_M$ is pushed or not. When the determination at step S1201 is negative, the routine proceeds to step S1202. When the determination at step S1201 is affirmative, the routine proceeds to step S1203.

At step S1202, controller 30 turns off the speed-range display 1-96. Then, controller 30 terminates the present routine of FIG. 11.

At step S1203, controller 30 determines whether the control is set or not. When the determination at step S1203 is negative, the routine proceeds to step S1204. When the determination at step S1203 is affirmative, the routine proceeds to step S1205.

At step S1204, controller 30 turns on a set-condition speed range such as a range from 48 km/h to 110 km/h, on speed range display section 1-96. Then, controller 30 terminates the present routine of FIG. 11. The set-condition speed range represents a speed range within which it is possible to execute a setting operation of the traveling control. This definition of the set-condition speed range is employed in the whole embodiments of the present invention.

At step S1205, controller 30 turns on a control-condition speed range such as a range from 38 km/h to 120 km/h, on speed range display section 1-96. Then, controller 30 terminates the present routine of FIG. 11. The control-condition speed range represents a speed range within which it is possible to continue the traveling control. This definition of the control-condition speed range is employed in the whole embodiments of the present invention.

Vehicle Speed Range Display Operation

When main switch $SM_M$ is not pushed (turned off), the routine of the flowchart of FIG. 11 proceeds from step S1201 to step S1202 wherein speed range display section 1-96 of speedometer 2—2 is turned off. Therefore, the speed range is not displayed.

Subsequently, when main switch $SW_M$ is pushed and when set switch $SW_S$ is not pushed (non set condition), the routine of FIG. 11 proceeds in the order of step S1201→step S1203→step S1204. Therefore, controller 30 commands speed range display section 1-96 to display the set-condition speed range wherein it is possible to execute the set operation enabling, as shown FIG. 12B. Such set-condition speed range is, for example, a range from 48 to 110 km/h.

When the driver intends to execute the traveling control during the vehicle traveling condition, the driver first looks at speedometer 2—2 to recognize that the present vehicle speed indicated by a pointer of speedometer 2—2 is within the set-condition speed range displayed by speed range display section 1-96. Then, the driver pushes set switch $SW_S$ after the recognition of the vehicle speed with in the set-condition speed range. By this turning on of set switch $SW_S$, controller 30 executes the set operation during a traveling condition where the set condition is established. Therefore, the control mode is changed from the control standby mode to the following mode, and the traveling control is started.

During the set condition in that both of main switch $SW_M$ and set switch $SW_S$ are pushed and the traveling control is being executed, the routine of FIG. 11 proceeds in the order of step S1201→step S1203→step S1205. Therefore, controller 30 commands speed range display section 1-96 of speedometer 2—2 to display the control-condition speed range wherein it is possible to continue the traveling control, as shown FIG. 12C. Such control-condition speed range is, for example, a range from 38 to 120 km/h.

Therefore, the driver can recognize that the present vehicle speed indicated by the pointer of speedometer 2—2 is within the control-condition speed range display by speed range display section 1-96, by looking at speedometer 2—2. That is, the driver can recognize whether it is now possible to continue the traveling control.

Next, the advantages of this system will be discussed.

As explained above, in the first embodiment of the state display apparatus of the vehicle traveling control system, there is provided a traveling controller 30 which transits the control mode from the control standby mode to the following mode, when set switch $SW_S$ is pushed during the vehicle traveling condition where the set condition is satisfied. The speed range display section 1-96 is provided along speedometer 2—2. Traveling controller 30 comprises a display content determining section 1-8 which outputs a display command for displaying the set-condition speed range during the non set condition and a display command for displaying the control-condition speed range to the speed range display section 1-96. Therefore, it is not necessary that the driver remembers the set-condition speed range in that it is possible to execute the set operation for the traveling control and the control-condition speed range in that it is possible to continue the traveling control. Further, it becomes possible to easily compare the present vehicle speed with the set-condition speed range and the control-condition speed range by having a glance at speedometer 2—2. This arrangement improves the utility of the traveling control.

SECOND EMBODIMENT

Referring to FIGS. 13 to 16, there is shown a second embodiment of the vehicle traveling control system with the state display apparatus according to the present invention. In this second embodiment, the speed range display determining process is executed by flowcharts of FIGS. 13, 14 and 15 instead of the control of FIG. 11 executed in the first embodiment. The structure and functions of the second embodiment are generally the same as those of the first embodiment shown in FIGS. 1 to 10 and 12. Therefore, the explanation thereof is omitted herein.

Speed Range Display Content Determining Process

Figure 13:
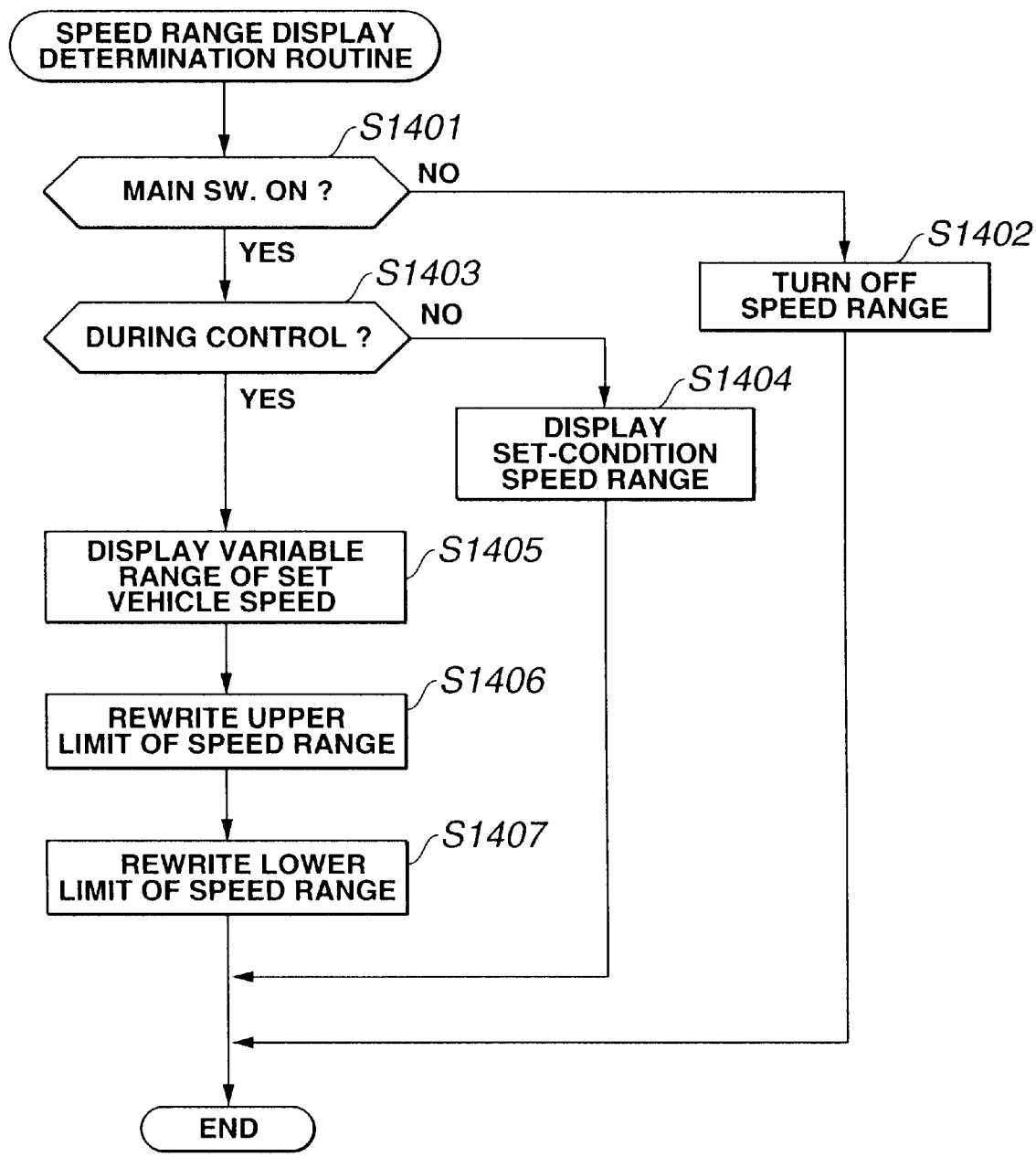
FIG. 13 a flowchart showing a speed range display determining process executed in a second embodiment according to the present invention.

FIG. 13 is a main flowchart showing the speed range display content determining process.

At step S1401, traveling controller 30 determines whether main switch $SW_M$ is turned on or not. When the determination at step S1401 is negative, the routine proceeds to step S1402. When the determination at step S1401 is affirmative, the routine proceeds to step S1403.

At step S1402, controller 30 turns off speed range display section 1-96. Then, controller 30 terminates the present routine of FIG. 13.

At step S1403, controller 30 determines whether the control is set or not. When the determination at step S1403 is negative, the routine proceeds to step S1404. When the determination at step S1403 is affirmative, the routine proceeds to step S1405.

At step S1404, controller 30 turns on the set-condition speed range, such as a range from 38 to 110 km/h, on speed range display section 1-96.

At step S1405, controller 30 turns on the speed range corresponding to the variable range of the set vehicle speed, such as a range from 40 to 110 km/h on speed range display section 1-96.

Figure 14:
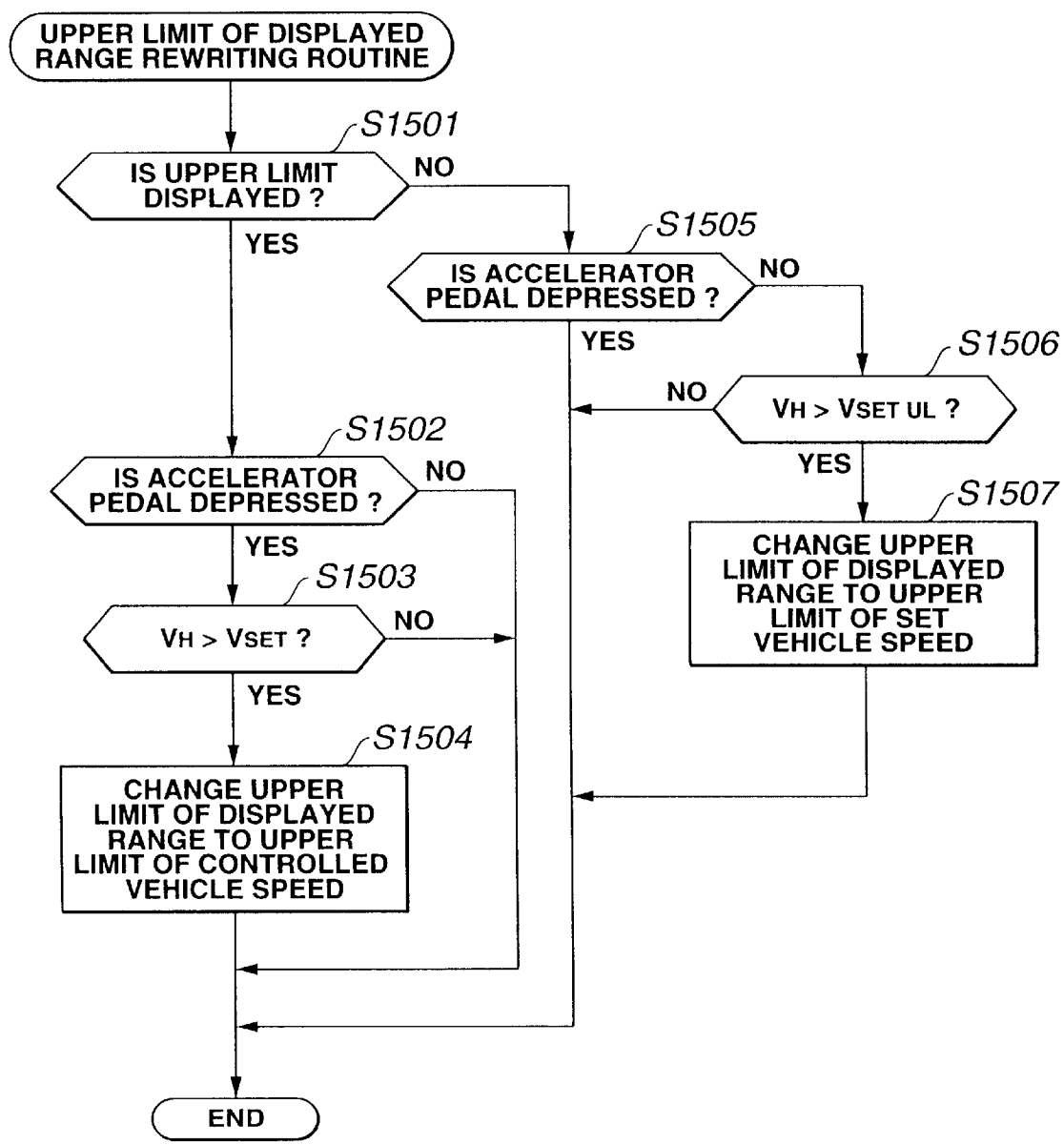
FIG. 14 is a flowchart showing an upper-limit rewriting process executed in the second embodiment.

At step S1406, controller 30 executes the rewriting of an upper limit of speed range display by executing a routine shown in FIG. 14.

Figure 15:
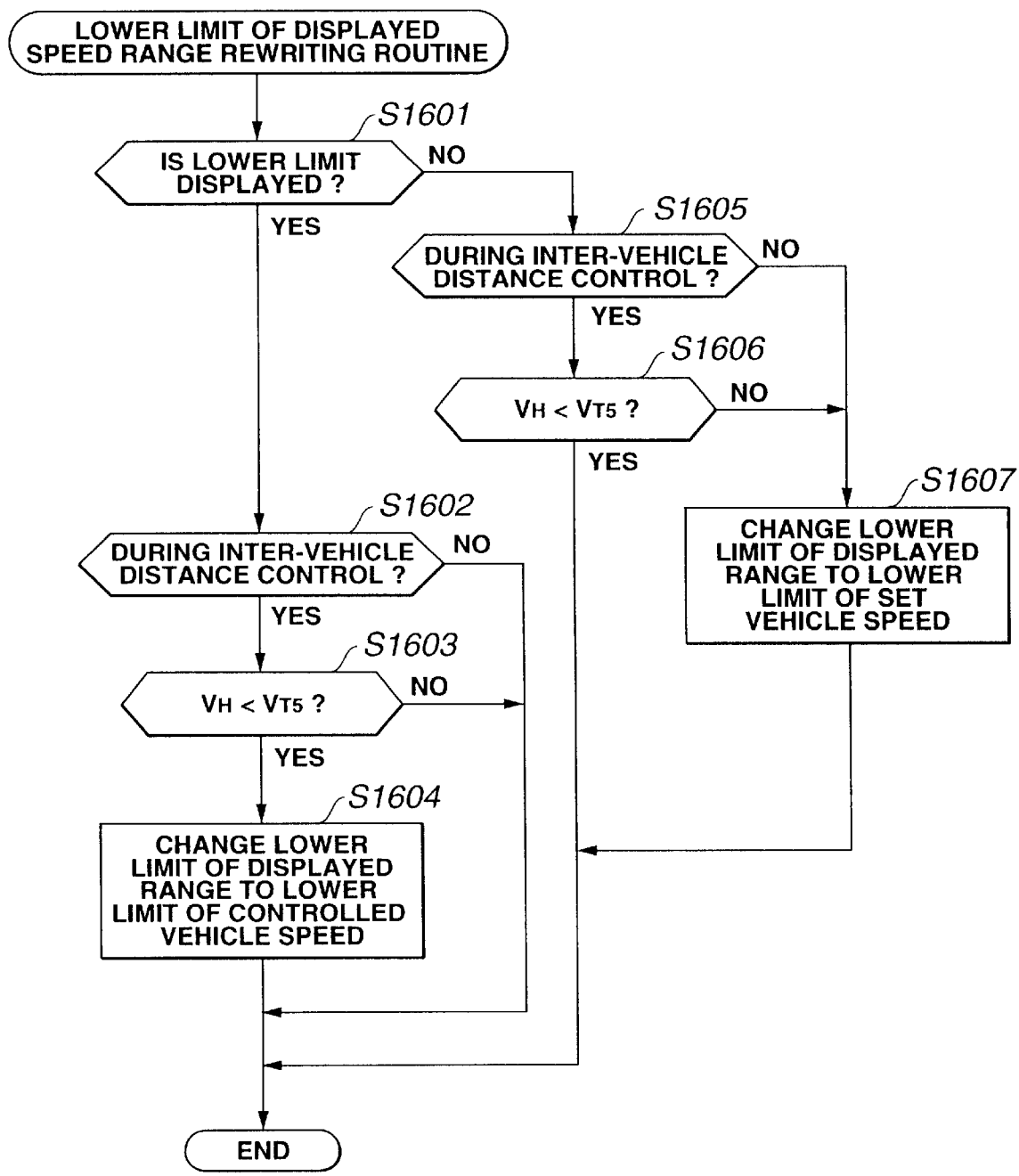
FIG. 15 is a flowchart showing a lower-limit rewriting process executed in the second embodiment.

At step S1407, controller 30 executes the rewriting of a lower limit of speed range display by executing a routine shown in FIG. 15. Then, controller 30 terminates the present routine of FIG. 13.

FIG. 14 is a flowchart showing a rewiring routine of the upper limit of the speed range display.

At step S1501, traveling controller 30 determines whether or not the upper limit of the set speed such as 110 km/h is displayed on speed range display section 1-96. When the determination at step S1501 is affirmative, the routine proceeds to step S1502. When the determination at step S1501 is negative, the routine proceeds to step S1505.

At step S1502, controller 30 determines whether or not the driver is increasing the depression degree of the accelerator pedal. When the determination at step S1502 is affirmative, the routine proceeds to step S1503. When the determination at step S1502 is negative, the routine proceeds to an end block to terminate the present routine of FIG. 14 without changing the upper limit of the displayed speed range.

At step S1503, controller 30 determines whether vehicle speed $V_H$ is greater than a set speed $V_{SET}$ or not. When the determination at step S1503 is affirmative ($V_H > V_{SET}$), the routine proceeds to steps S1504. When the determination at step S1503 is negative ($V_H \leq V_{SET}$), the routine proceeds to the end block.

At step S1504, controller 30 rewrites the upper limit of the display range to the upper vehicle speed (high cut vehicle speed) of the control. In this second embodiment, the upper limit of the display range is changed from 110 km/h to 120 km/h.

When the determination at step S1501 is negative, the displayed upper limit is the upper limit of the controlled vehicle speed such as 120 km/h since the displayed upper limit displayed during the control is one of the upper limit of the set vehicle speed and the upper limit of the controlled vehicle speed. Accordingly, when the displayed upper limit is the upper limit of the controlled vehicle speed, the routine proceeds to step S1505.

At step S1505, controller 30 determines whether the driver is increasing the depression degree of the accelerator pedal. When the determination at step S1505 is affirmative, the routine proceeds to the end block. When the determination at step S1505 is negative, the routine proceeds to step S1506.

At step S1506, controller 30 determines whether vehicle speed $V_H$ is smaller than the upper limit $V_{SETUL}$ (such as 110 km/h) of the set vehicle speed or not. When the determination at step S1506 is affirmative, the routine proceeds to steps S1507. When the determination at step S1506 is negative, the routine proceeds to the end block to terminate the present routine without rewiring the upper limit.

At step S1507, controller 30 rewrites the upper limit of the display range to the upper limit of the set vehicle speed (such as 110 km/h).

FIG. 15 is a flowchart showing a rewiring routine of the lower limit of the speed range display.

At step S1601, traveling controller 30 determines whether or not the lower limit of the set speed such as 50 km/h is displayed on the speed range display section 1-96. When the determination at step S1601 is affirmative, the routine proceeds to step S1602. When the determination at step S1601 is negative, the routine proceeds to step S1605.

At step S1602, controller 30 determines whether or not the inter-vehicle distance controller is being executed. When the determination at step S1602 is affirmative, the routine proceeds to step S1603. When the determination at step S1602 is negative, the routine proceeds to an end block to terminate the present routine of FIG. 15 without changing the lower limit of the display range.

At step S1603, controller 30 determines whether or not vehicle speed $V_H$ is smaller than a predetermined value $V_{TS}$ such as 50 km/h. When the determination at step S1603 is affirmative, the routine proceeds to steps S1604. When the determination at step S1603 is negative, the routine proceeds to the end block.

At step S1604, controller 30 rewrites the lower limit of the display range to the lower-limit vehicle speed (low-cut vehicle speed) of the control. In this embodiment, the lower limit of the display range is changed from 50 km/h to 38 km/h.

When the determination at step S1601 is negative, the displayed lower limit is the lower limit of the host vehicle speed such as 38 km/h since the displayed lower limit displayed during the control is one of the lower limit (such as 50 km/h) of the set vehicle speed and the lower limit (such as 38 km/h) of the controlled vehicle speed. Accordingly, when the displayed lower limit is the lower limit of the controlled vehicle speed, the routine proceeds to step S1605.

At step S1605, controller 30 determines whether or not the inter-vehicle distance controller is being executed. When the determination at step S1605 is affirmative, the routine proceeds to step S1606. When the determination at step S1605 is negative, the routine proceeds to step S1607.

At step S1606, controller 30 determines whether or not vehicle speed $V_H$ is smaller than a predetermined value $V_{T5}$ such as 50 km/h. When the determination at step S1606 is affirmative, the routine proceeds to the end block. When the determination at step S1606 is negative, the routine proceeds to steps S1607.

At step S1607, controller 30 rewrites the lower limit of the display range to the lower limit of the set vehicle speed (such as 50 km/h).

Speed Range Display Operation

Figure 16:
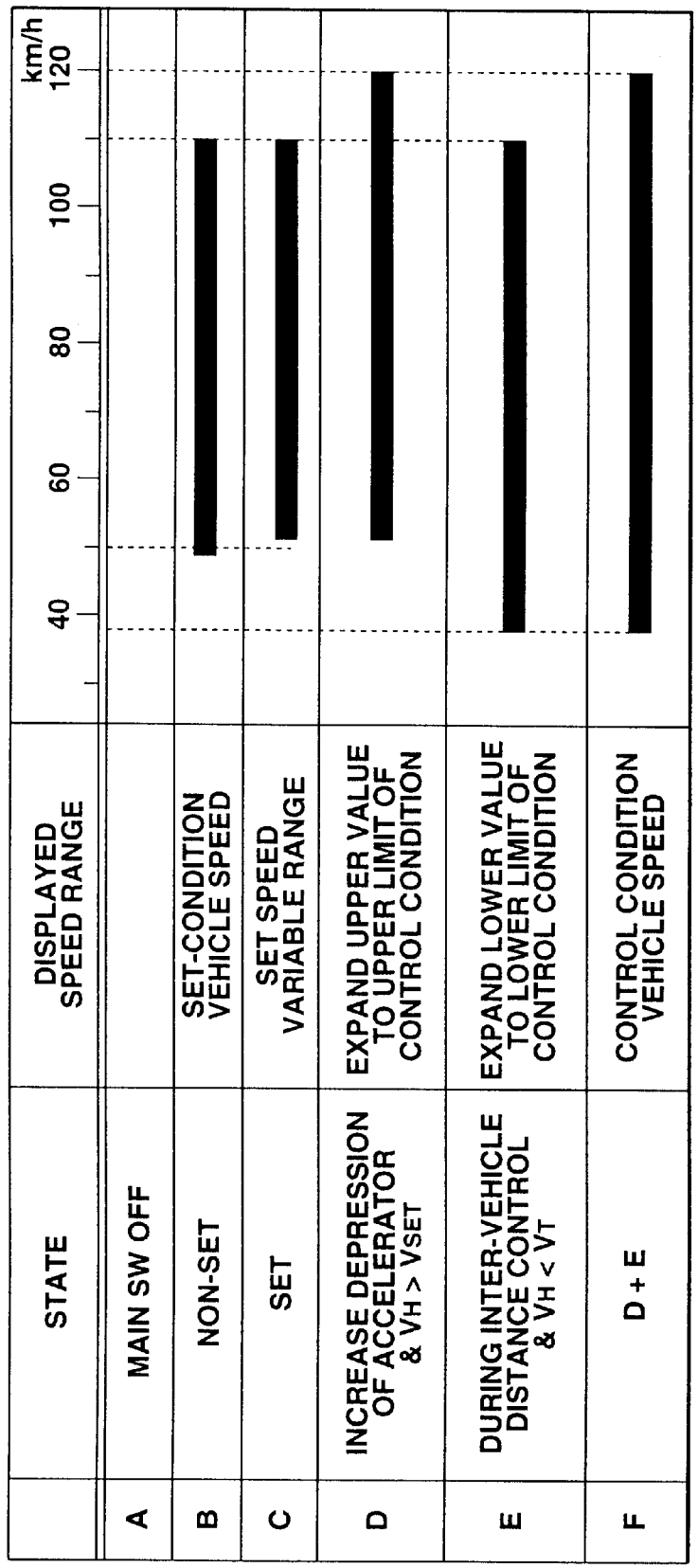
FIG. 16 is a view showing a content of a displayed speed range by each state in the second embodiment.

When main switch $SM_M$ is not pushed, the routine of the flowchart of FIG. 13 proceeds from step S1401 to step S1402 wherein speed range display section 1-96 of speedometer 2—2 is turned off as shown by (A) in FIG. 16. Therefore, the speed range is not displayed.

Subsequently, when main switch $SW_M$ is pushed and when set switch $SW_S$ is not pushed (non set condition), the routine of FIG. 13 proceeds in the order of step S1401→step S1403→step S1404. Therefore, traveling controller 30 commands speed range display section 1-96 to display the set-condition speed range where it is possible to execute the setting operation, as shown by (B) of FIG. 16. Such set-condition speed range is, for example, a range from 48 to 110 km/h.

Accordingly, when the driver intends to execute the traveling control during the vehicle traveling condition, the driver first looks at speedometer 2—2 to recognize that the present vehicle speed indicated by a pointer of speedometer 2—2 is within the set-condition speed range displayed by speed range display section 1-96. Then, the driver pushes set switch $SW_S$ after the recognition of the vehicle speed within the set-condition speed range. By this turning-on of set switch $SW_S$, controller 30 executes the set operation during a traveling condition where the set condition is established. Therefore, the control mode is changed from the control standby mode to the following mode. Further, when the preceding vehicle is recognized, traveling controller 30 follows the preceding vehicle by executing an inter-vehicle distance control for bringing the measured inter-vehicle distance closer to the target inter-vehicle distance and by controlling the actual vehicle speed so as to be smaller than the target vehicle speed. On the other hand, when no preceding vehicle is recognized ahead of the host vehicle, traveling controller 30 executes the constant speed control (cruise control) for bring the measured vehicle speed closer to the target vehicle speed.

When both of main switch $SW_M$ and set switch $SW_S$ are pushed and when the traveling control is being executed, the routine of FIG. 13 proceeds in the order of step S1401→step S1403→step S1405. Therefore, traveling controller 30 commands speed range display section 1-96 of speedometer 2—2 to display the speed range corresponding to a variable range of the set vehicle speed as shown by (C) of FIG. 16. Such speed range corresponding to the variable range of the set vehicle speed is, for example, a range from 50 to 110 km/h.

Therefore, when the driver desires to change the set vehicle speed during the traveling control, it is possible to change the set vehicle speed by pushing set switch $SW_S$ after the driver recognizes that the present vehicle speed indicated by the pointer of speedometer 2—2 is within the speed range displayed by speed range display section 1-96 by looking at speedometer 2—2.

Further, when set switch $SW_S$ has be pushed (set condition) and when the vehicle speed $V_H$ becomes greater than the set vehicle speed $V_{SET}$ by increasing depression of the accelerator pedal, the routine of FIG. 14 proceeds in the order of step S1501→step S1502→step S1503→step S1504. Accordingly, as shown by (D) of FIG. 16, traveling controller 30 outputs a command for displaying the extended control-condition speed range which is extended to the maximum value of the control condition, and therefore speed range display section 1-96 of speedometer 2—2 displays the extend control-condition speed range whose upper limit is extended to the upper limit of the control condition. For example, the speed range is set at a range from 50 to 120 km/h.

When the driver terminates the increasing depression of the accelerator pedal and when the vehicle speed becomes smaller than the maximum value of the set vehicle speed variable range, the routine of FIG. 14 proceeds in the order of S1501→step S1505→step S1506→step S1507. Therefore, the speed range is returned to an original state which is the variable range of the set vehicle speed such as a range 50 to 110 km/h.

Further, during the set condition, when the vehicle speed is very low under the inter-vehicle distance control, the routine of FIG. 15 proceeds in the order of S1601→step S1602→step S1603→step S1604. Accordingly, as shown by (E) of FIG. 16, controller 30 outputs a command for displaying the speed range which is extended to the minimum value of the control condition, and therefore speed range display section 1-96 of speedometer 2—2 displays the extend speed range whose lower limit is extended to the lower limit of the control condition. For example, the speed range is set at a range from 38 to 110 km/h.

When the inter-vehicle distance control is not executed or when the vehicle speed becomes higher than a predetermined intermediate value, such as 50 km/h, the routine of FIG. 15 proceeds in the order of step S1601→step S1605 (step S1606)→step S1607. Therefore, the speed range is returned to an original state which corresponds to the variable range of the set vehicle speed, such as a range 50 to 110 km/h).

That is, the vehicle speed range of the control condition is, for example, a range from 38 to 120 km/h as shown by (F) of FIG. 16. On the other hand, the set vehicle speed is a maximum vehicle speed during the control. Only when the driver increases the depression degree of the accelerator pedal, the vehicle speed becomes greater than the set speed (reaches 120 km/h). Accordingly, it is possible to limit the necessary situation for displaying the control high-cut vehicle speed (control upper limit) to the situation that the driver is increasing the depression degree of the accelerator pedal. Further, only when the inter-vehicle distance control is executed, the vehicle speed becomes smaller than the set speed. Accordingly, it is possible to limit the necessary situation for displaying the control low-cut vehicle speed (control upper limit) to the situation that the inter-vehicle distance control is executed.

Therefore, in the second embodiment, during the second condition, the variable range of the set speed is basically set at a range such as 50 to 110 km/h, and only when the traveling situation (the increasing depression of accelerator pedal and the vehicle speed condition), the upper limit of the set vehicle speed is extended to the upper limit of the control condition and is displayed. Further, only when the traveling situation (the inter-vehicle distance control and the vehicle speed condition) is satisfied, the lower limit of the set vehicle speed is extended to the lower limit of the control condition and is displayed. With these arrangements of the second embodiment, it becomes possible to display the vehicle speed range from which the driver can recognize both of the variable range of the set vehicle speed and the control-condition speed range.

Next, the advantages gained by the arrangement of the second embodiment according to the present invention will be discussed.

As explained above, in the second embodiment of the state display apparatus of the vehicle traveling control system, the control mode is transited from the control standby mode to the following mode when set switch $SW_S$ is pushed during the set-condition satisfying traveling state. The speed range display section 1-96 is provided along speedometer 2—2. Traveling controller 30 comprises a display content determining section 1-8 which outputs a display command for displaying the set-condition speed range during the non set condition and a display command for displaying the speed range corresponding to a variable range of the set vehicle speed, for displaying the upper extended speed range whose upper limit is extended to the maximum value of the control condition only when the driver increases the depression degree of the accelerator pedal, and a display command for displaying the lower extended speed range whose lower limit is extended to the minimum value of the control condition. Therefore, the driver can further easily recognize the information relating to the traveling control system.

Simultaneously, since the second embodiment is arranged such that the display of the variable range of the set vehicle speed is extended to the maximum value of the control condition and to the lower minimum value of the control condition without switching the variable range of the set vehicle speed and the speed range of the control condition, it possible to eliminate unnecessary switching of the speed range, and therefore the driver can further easily recognize the speed range.

THIRD EMBODIMENT

Figure 17:
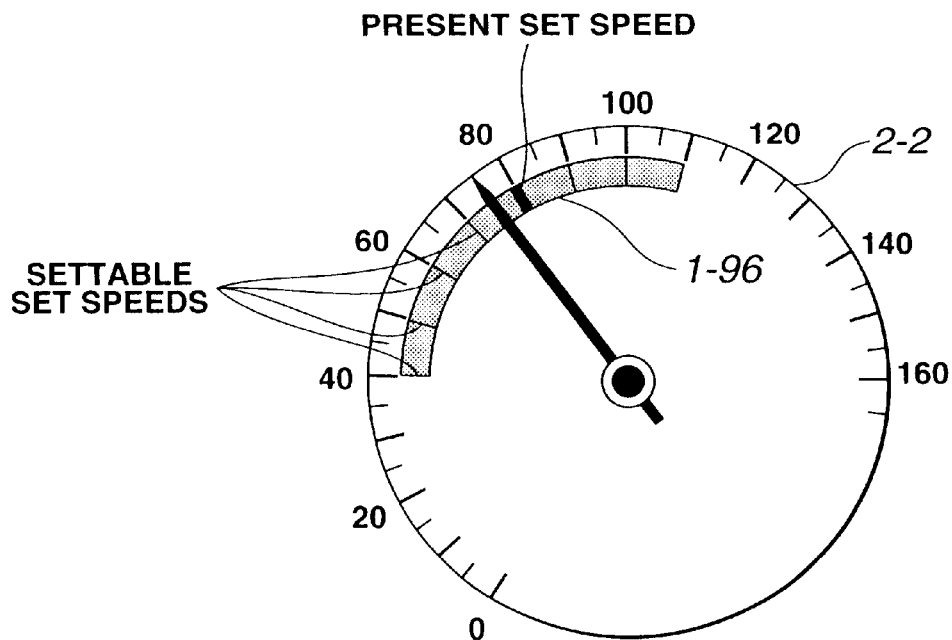
FIG. 17 is a view showing a displayed content of the speed range in a third embodiment.

Referring to FIG. 17, there is shown a third embodiment of the vehicle traveling control system with the state display apparatus according to the present invention.

The third embodiment is specifically arranged such that when the speed range is displayed on the vehicle speed range display section 1-96, the present set vehicle speed and the settable vehicle speed which the driver can set by every 5 km/h, are displayed (indicated by every 5 km/h) as shown in FIG. 17.

With this arrangement of the third embodiment according to the present invention, the present set vehicle speed is displayed and the settable vehicle speed set by the driver is pointed. Therefore, the driver easily and clearly recognizes the set condition of the vehicle speed range.

The other construction and advantages of the third embodiment are basically the same as those of the first embodiment and/or the second embodiment. Therefore, the explanation thereof is omitted herein.

FOURTH EMBODIMENT

Figure 18:
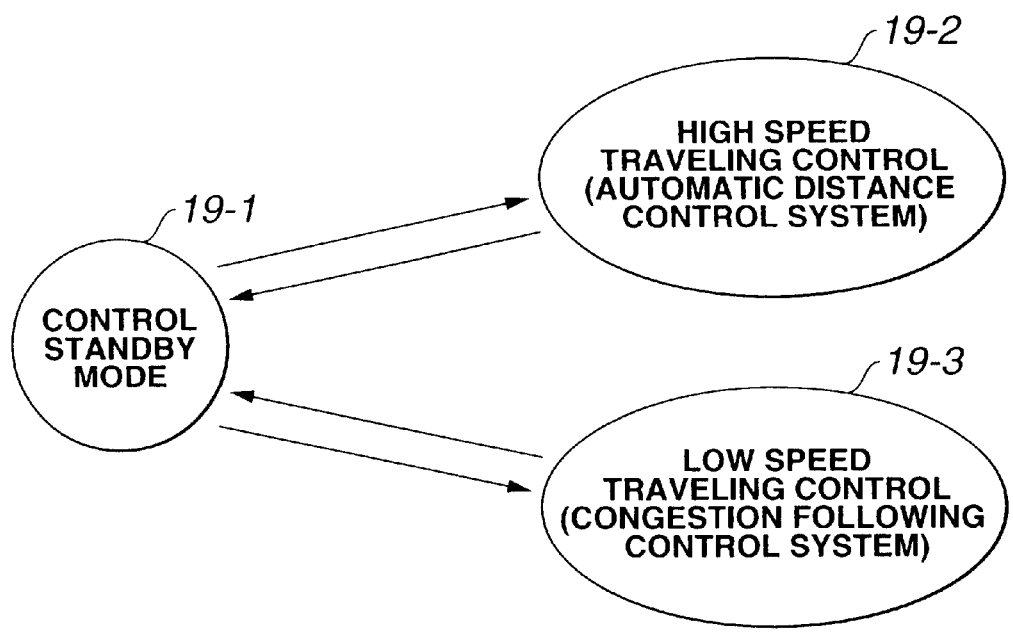
FIG. 18 is an explanatory view explaining a relationship of the control modes and conditions in a fourth embodiment.
Figure 19:
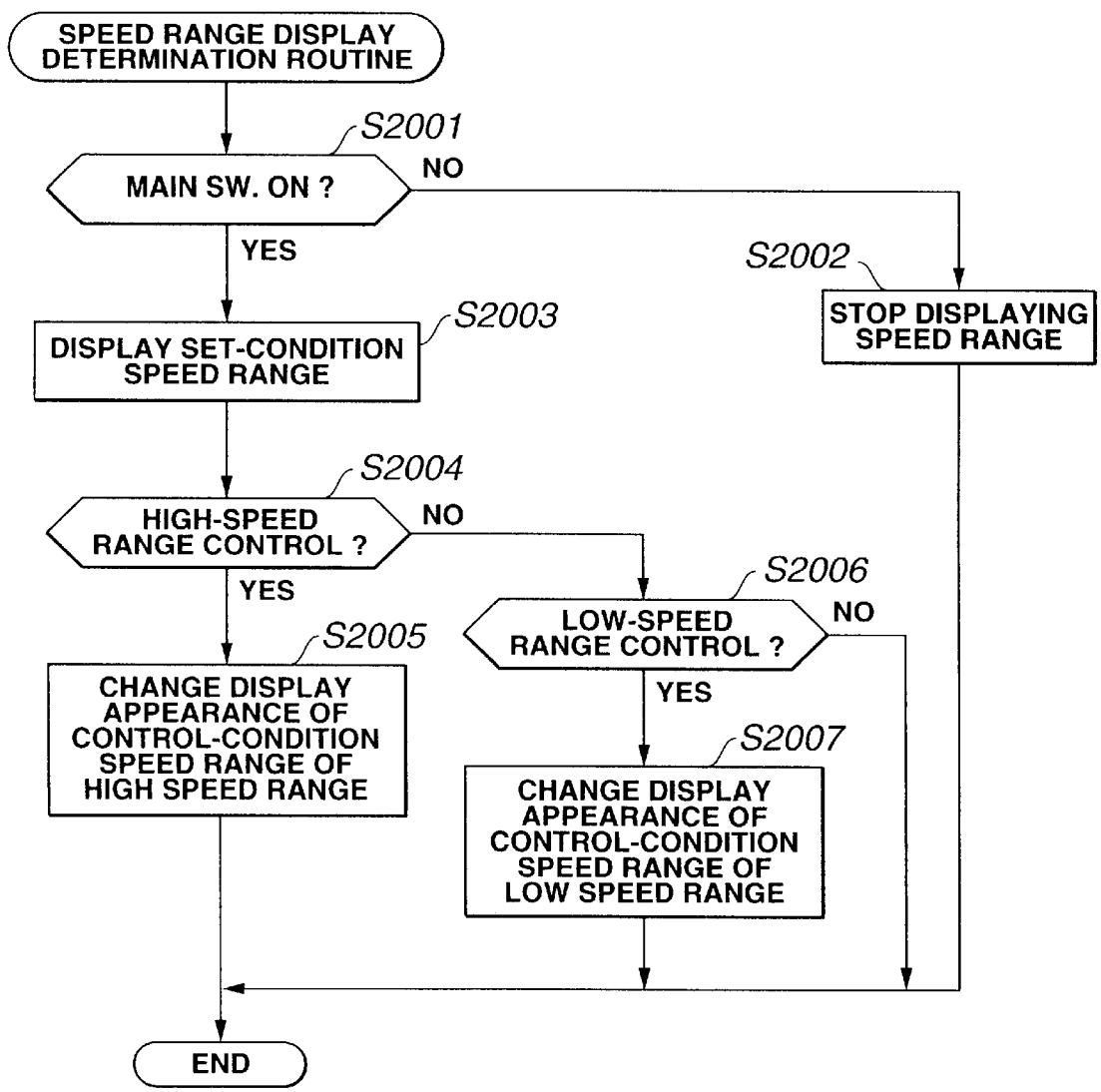
FIG. 19 is a flowchart showing a speed range display determining process in the fourth embodiment.

Referring to FIGS. 18 to 20, there is shown a fourth embodiment of the vehicle traveling control system with the state display apparatus according to the present invention. In this fourth embodiment, traveling controller 30 comprises an adaptive cruise control system (ACC system) for controlling an inter-vehicle distance at high-speed cruising condition and an inching control system for controlling a running of the vehicle under an extremely low speed condition including the traffic congestion condition.

As shown in FIG. 20, a high-speed range display section 1-96H for displaying the vehicle speed range during the high speed traveling control and a low-speed range display section 1-96L for displaying the vehicle speed range during the low speed travel control are displayed along the vehicle-speed scale of speedometer 2—2. Further, display content determining section 1-8 of traveling controller 30 outputs the display command to high-speed range display section 1-96H and/or low-speed range display section 1-96L according to whether the set condition or not.

That is, the fourth embodiment is arranged such that the mode transition content shown in FIG. 4 of the first embodiment is changed to the mode transition content adapted to the two speed ranges of the high-speed range and the low-speed range as shown in FIG. 18. Further, the speed range display determining process shown in FIG. 19 is employed instead of the process of the first embodiment shown in FIG. 11, so that the example thereof is shown in FIG. 20.

The construction and operations of the fourth embodiment are basically the same as those shown in FIGS. 1–3, 5–10 and 12 of the first embodiment. Therefore, the explanation thereof is omitted herein.

Control Transition according to Speed Range

FIG. 18 shows a condition transition among the control modes in the control content calculating section 1-5 of traveling controller 30.

19-1 denotes the control standby mode as is similar to FIG. 4 and is introduced when main switch $SW_M$ is turned on from an off state. 19-2 denotes a condition that the high-speed range traveling control (automatic inter-vehicle distance control system) at a high-speed range, such as 50 km/h to 110 km/h, is being executed. During this condition, the following mode 3-2 and the control rest mode 3—3 shown in FIG. 4 exist. 19-3 denotes a condition that the low-speed range traveling control (traffic-congestion following control system) at a low speed range, such as 5 km/h to 30 km/h, is being executed. During this condition, following mode 3-2 and control rest mode 3—3 shown in FIG. 4 exist.

The transition from the control standby mode 19-1 to the high speed range traveling control 19-2 is executed when the host vehicle travels at a predetermined speed at D range (for example, in a range 50 km/h to 110 km/h and when set switch $SW_S$ is pushed. The transition from high-speed range traveling control 19-2 to control standby mode 19-1 is executed when cancel switch $SW_C$ is pushed or when the predetermined cancel condition satisfied. Similarly, the transition from control standby mode 19-1 to low-speed range traveling control 19-3 is executed when the host vehicle travels at another predetermined speed at D range (for example, in a range 5 km/h to 30 km/h) and when set switch $SW_S$ is pushed during the traveling condition. The transition from low-speed range traveling control 19-3 to control standby mode 19-1 is executed when cancel switch $SW_C$ is pushed or when a predetermined cancel condition is satisfied.

Speed Range Display Content Determining Process

FIG. 20 shows a flowchart of the vehicle speed range display content determining process.

At step S2001, traveling controller 30 determines whether main switch $SW_M$ has been pushed or not. When the determination at step S2001 is affirmative, the routine proceeds to step S2003. When the determination at step S2001 is negative, the routine proceeds to step S2002 wherein controller 30 turns off high-speed range display section 1-96H and low-speed range display section 1-96L. Then the present routine of FIG. 19 is terminated.

At step S2003, controller 30 displays the speed range corresponding the set condition on the high-speed range display section 1-96H, such as 50–110 km/h and simultaneously displays the speed range corresponding to the set condition on the low-speed range display section 1-96L, such as 5–30 km/h.

At step S2004, controller 30 determines whether the control (automatic inter-vehicle distance control) at the high-speed range is set or not. When the determination at step S2004 is affirmative, the routine proceeds to step S2005. When the determination at step S2004 is negative, the routine proceeds to step S2006.

At step S2005, controller 30 changes the display appearance, for example in color or brightness, of the displayed content of the speed range corresponding to the high-speed range control condition, such as 50–120 km/h.

At step S2006, controller 30 determines whether the control at the low-speed range is set or not. When the determination at step S2006 is affirmative, the routine proceeds to step S2007. When the determination at step S2006 is negative, the routine proceeds to the end block to terminate the present routine.

At step S2007, controller 30 changes the display appearance, for example, in color or brightness of the displayed content of the low-speed range control-condition speed range, such as 5–30 km/h.

Speed Range Display Function

When main switch $SW_M$ is not pushed, the routine of FIG. 20 proceeds from step S2001 to step S2002, and at step S2002 the speed range display section 1-96 (high speed range display section 1-96H and low speed range display section 1-96L) of speedometer 2—2 is turned off to stop the display of the speed range.

Subsequently, when main switch $SW_M$ is pushed and when set switch $SW_S$ is not pushed, that is, when the control is in a non set condition, the routine of FIG. 19 proceeds in the order of step S2001→step S2003→step S2004→step S2006→end block. As shown in the non-controlled condition in FIG. 20, the command for commanding the display sections 1-96H and 1-96L of speedometer 2—2 to display the set-condition speed rang wherein it is possible to execute the set operation of the traveling control. Therefore, the high-speed range display section 1-96H and the low-speed range display section 1-96L of speedometer 2—2 display the high-speed range set-condition speed range and the low-speed range set-condition speed range, respectively.

When the driver intends to execute the traveling control during the vehicle traveling condition, the driver first checks whether the present vehicle speed pointed by the pointer of the speedometer 2—2 is in the set-condition speed range displayed on the high-speed range display section 1-96H or the low-speed range display section 1-96L. When the present vehicle speed is in the displayed speed range, the driver then pushes set switch $SW_S$. With this pushing operation, the set operation during the traveling condition in that the set condition is established is executed. Therefore, when the vehicle travels at low speed, the control mode is transited from the control standby mode to the low-speed range traveling control by which the traffic-congestion following control system is executed. When the vehicle travels at high speed, the control mode is transited from the control standby mode to the high-speed range traveling control by which the inter-vehicle distance control is executed.

During the high-speed range control condition in the set condition, the high-speed range control-condition speed range is displayed on the high-speed range display section 1-96H of speedometer 2—2 as shown in FIG. 20. The appearance of the displayed speed range is changed from that of the set-condition display executed during the non-control state. Particularly, the appearance is changed in color or brightness.

During the low-speed range control condition in the set condition, the low-speed range control-condition speed range is displayed on the low-speed range display section 1-96L of speedometer 2—2 as shown in FIG. 20. The appearance of the displayed speed range is changed from that of the set-condition display executed during the non-control state. Particularly, the appearance is changed in color or brightness.

With the state display apparatus of the vehicle traveling control system of the fourth embodiment, the vehicle traveling control system of the fourth embodiment comprises traveling controller 30 which executes a mode transition from the control standby mode to the high-speed range traveling control mode or the low-speed range traveling control mode when set switch $SW_S$ is pushed during a traveling condition in which the set condition is established. Further, the state display apparatus of the fourth embodiment comprises a high-speed range display section 1-96H for displaying a speed range of the high speed range traveling control along the scale of the speedometer 2—2 and a low-speed range display section 1-96L for displaying a speed range of the low speed range traveling control along the scale of the speedometer 2—2. Furthermore, the display content determining section 1-8 is arranged to display the speed range while the appearance of the speed range is changed such as in color or brightness or design according to whether it is now set at a set condition or non-control condition, even if a plurality of control systems which operated in the respective speed ranges are employed in the vehicle. Therefore, the driver can utilize these systems without remembering the respective speed ranges of the respective controls. Further, the driver can easily recognize which one of the controls is operating.

FIFTH EMBODIMENT

Figure 21:
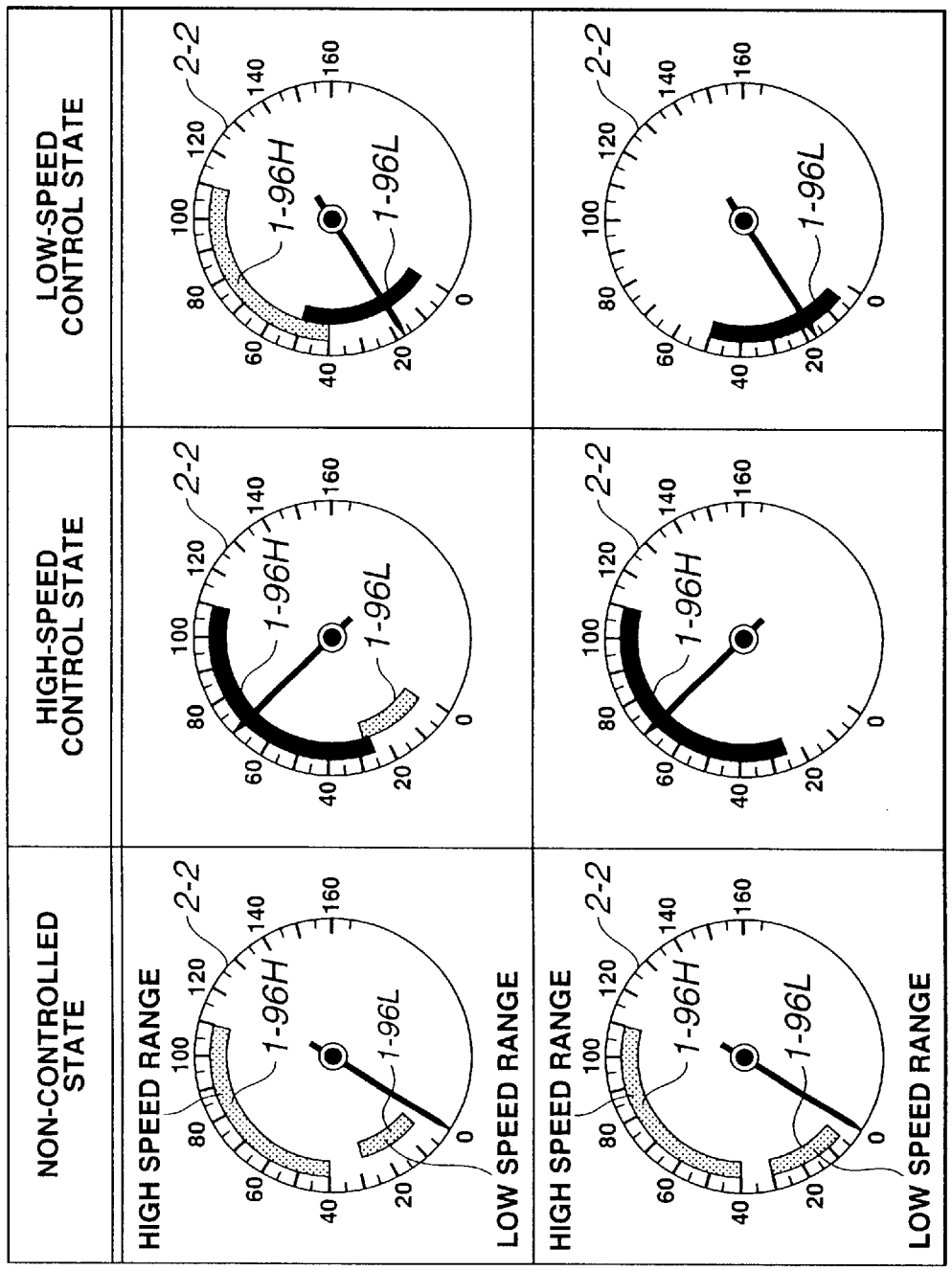
FIG. 21 is a view showing a content of a displayed speed range by each state in a fifth embodiment.

Referring to FIG. 21, there is shown a fifth embodiment of the vehicle traveling control system with the state display apparatus according to the present invention. In the fifth embodiment, the high-speed range display and the low-speed range display are specially arranged such that the driver can easily recognize which one of the two controls is operating even when the set-condition speed range is overlapped with the control-condition speed range.

More specifically, as shown by upper side figures in FIG. 21, the high speed range display section 1-96H and the low speed range display section 1-96L are offset in the diametrical direction so that they have the overlapped portions respectively, such as 25–50 km/h.

Further, as a modification of the fifth embodiment, the display content determining section 1-8 of the traveling controller 30 may be arranged such that when the speed range of the set condition is overlapped with the speed range of the control condition, only the speed range in the controlled condition of one of the set condition and the control condition is displayed. During the high-speed range traveling control, the speed range corresponding to the set condition of the low speed range traveling control is not displayed (turned off). Further during the low-speed range traveling control, the control-condition speed range of the high speed range traveling control is not displayed (turned off), as shown by lower side figures in FIG. 21.

With these arrangements of the display content determining section and the display sections 1-96H and 1-96L of the fifth embodiment, it becomes possible to prevent the set-condition speed range and the control-condition speed range from being overlappedly displayed even when the two controls are overlappedly employed.

SIXTH EMBODIMENT

Referring to FIG. 22, there is shown a sixth embodiment of the vehicle traveling control system with the state display apparatus according to the present invention. The sixth embodiment is arranged such that in the fourth embodiment the appearance such as color, design or brightness of the display is changed according to whether the present operating system is the inter-vehicle distance control active in the high-speed range or the traffic-congestion following control system active in the low-speed range. With this arrangement, the driver can easily recognize the system which is now operating.

More specifically, the display content determining section 1-8 of traveling controller 30 of the sixth embodiment is arranged such that the displaying method (appearance) is changed according to the operating system of the inter-vehicle distance control system (ACC system) operated in the high speed-range and the traffic-congestion following control system operated in the low-speed range, as shown in FIG. 21. By changing the color, the design or the brightness, the appearance of the displayed content is changed. Further, by coordinating the color of the display section of displaying the steady-state information with the color of high-speed range display section 1-96H and low-speed range display section 1-96L, the relativity between the speed range display content and the displayed steady state information is further easily recognized.

SEVENTH EMBODIMENT

Figure 23:
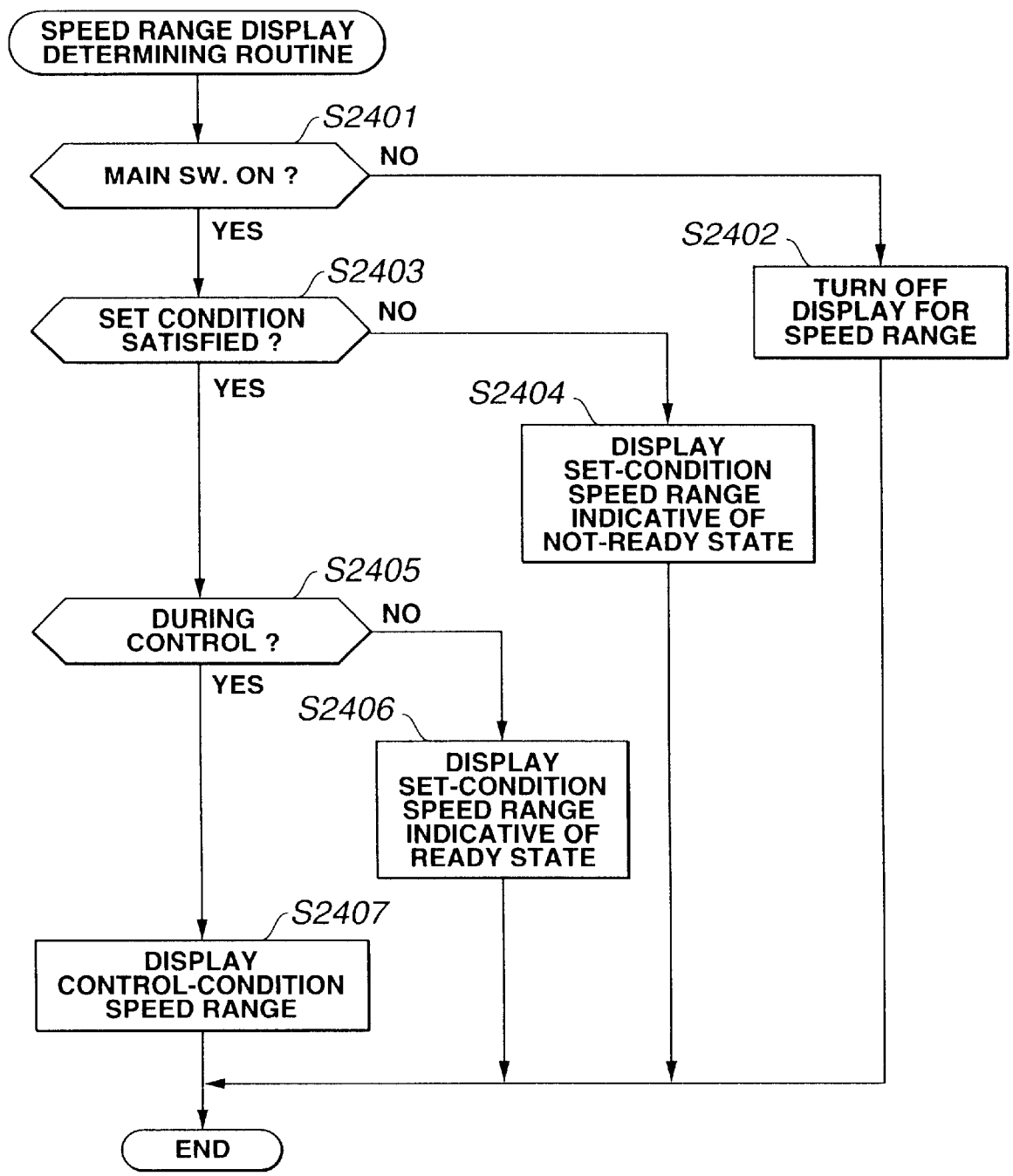
FIG. 23 is a flowchart showing a speed range display determining process in a seventh embodiment.
Figure 24:
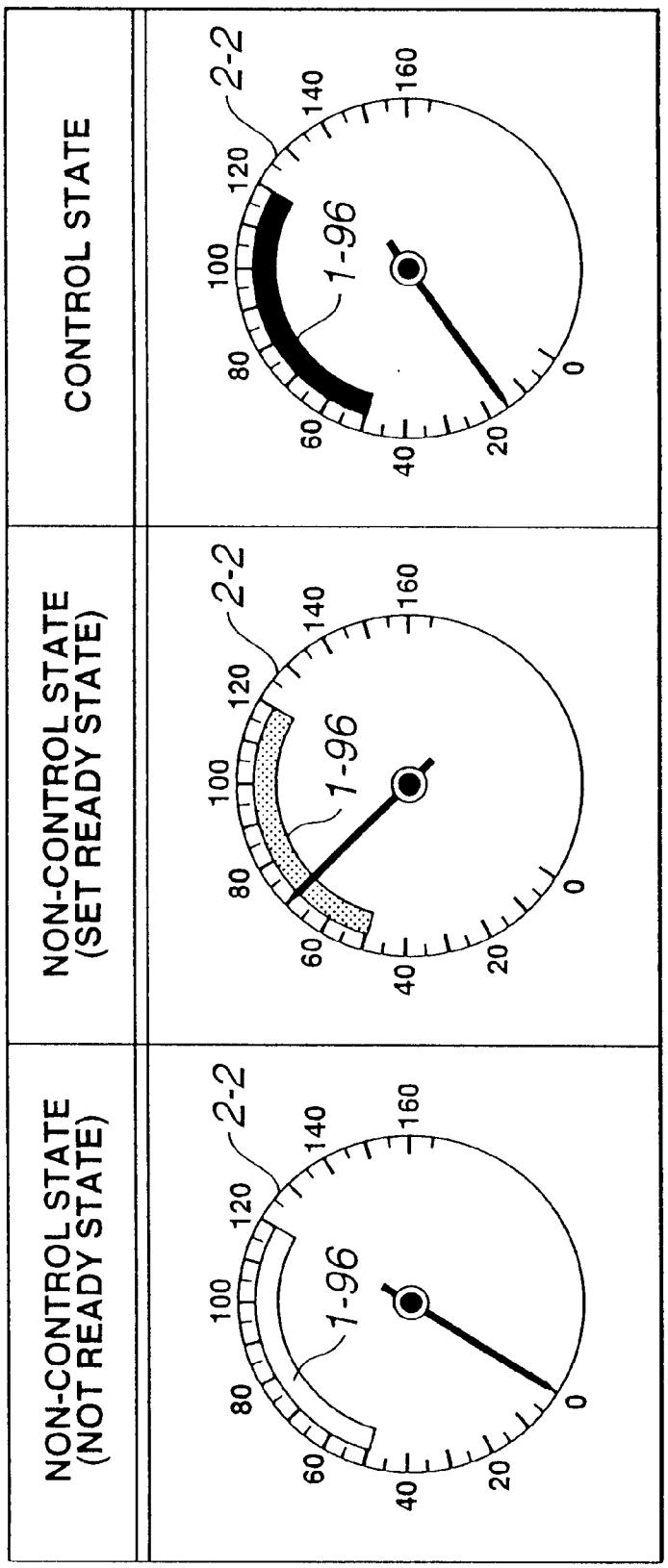
FIG. 24 is a view showing a content of a displayed speed range by each state in the seventh embodiment.

Referring to FIGS. 23 and 24, there is shown a seventh embodiment of the vehicle traveling control system with the state display apparatus according to the present invention. The seventh embodiment is specifically arranged such that the control mode of traveling controller 30 comprises a not-ready state (control standby mode) during the non-control state, a set ready state (control rest mode) during the non-control state, and a control state (traveling control mode). Further, display content determining section 1-8 is arranged such that the appearance of the displayed speed range is changed in color, design or brightness according to the control state selected from the not-ready state during the non-control state, the set ready state during the non-control state and the control state.

FIG. 23 shows a flowchart of the vehicle speed range display content determining process of the seventh embodiment.

At step S2401, traveling controller 30 determines whether main switch $SW_M$ is pushed or not. When the determination at step S2401 is negative, the routine proceeds to step S2402. When the determination at step S2401 is affirmative, the routine proceeds to step S2403.

At step S2402, controller 30 turns off the vehicle speed range display section 1-96. Then, the routine proceeds to an end block to terminate the present routine.

At step S2403, controller 30 determines whether the set condition is satisfied or not. In this embodiment, the set condition includes a vehicle speed condition, a shift position set at D range, a brake condition that brake is not depressed, a not-low friction road surface that ABS, TCS, or VDC is inoperative, no radar trouble that there is no interference of radio wave and no dirt of a radar apparatus. When the determination at step S2403 is affirmative, the routine proceeds to step S2405. When the determination at step S2403 is negative, the routine proceeds to step S2404.

At step S2404, controller 30 displays the set-condition speed range whose appearance characteristically indicates the not ready state by characteristically changing color, brightness, or design. Then, the routine proceeds to the end block to terminate the present routine.

At step S2405 subsequent to the affirmative determination at step S2403, controller 30 determines whether the control is set or not. When the determination at step S2405 is negative, that is, when it is in non-set state, the routine proceeds to step S2407. When the determination at step S2405 is affirmative, that is, when it is in a control set state, the routine proceeds to step S2407.

At step S2406, controller 30 displays the set-condition speed range by changing the appearance of the displayed speed range in color, brightness or design so as to indicate the ready state. Then, the routine proceeds to the end block.

At step S2407, controller 30 displays the control-condition speed range by differentiating its appearance from those of the not-ready state and the ready state in color, brightness or design. Then, the routine proceeds to the end block.

Speed Range Display Function

When main switch $SW_M$ is not pushed, the routine of FIG. 23 proceeds in the order of step S2401→step S2402. At step S2402, controller 30 turns off the speed range display section 1-96 of speedometer 2—2, and therefore the speed range is not displayed.

When main switch $SW_M$ is pushed and when the state is the not ready state where the set condition is not satisfied, the routine of FIG. 23 proceeds in the order of step S2401→step S2403→step S2404. With this processing of the routine, the set-condition speed range corresponding is displayed on the speed range display section 1-96 of speedometer 2—2 as shown by a non-control state (not ready state) in FIG. 24.

When main switch $SW_M$ is pushed, when the set condition is satisfied and when it is in a non controlled state (ready state) in that set switch $SW_S$ is not pushed, the routine of FIG. 23 proceeds in the order of step S2401→step S2403→step S2405→step S2406. With this processing of the routine, the set-condition speed range is displayed on the speed range display section 1-96 of speedometer 2—2 although the appearance (color, brightness or design) of this speed range is different from that of the not ready state, as shown by a non-control state (set ready state) in FIG. 24.

Further, when main switch $SW_M$ is pushed and when the set condition is satisfied and when the control is being executed by pushing set switch $SW_S$, the routine of FIG. 22 proceeds in the order of step S2401→step S2403→step S2405→step S2407. With this processing of the routine, the speed range corresponding to the set condition is displayed on the speed range display section 1-96 of speedometer 2—2 with the appearance (color, brightness or design) of this speed range which appearance is different from those of the not ready state and the ready state, as shown by a control state of FIG. 24.

With these arrangements in the seventh embodiment according to the present invention, the driver can easily recognize the control mode of the traveling control which is now being executed.

EIGHTH EMBODIMENT

Figure 25:
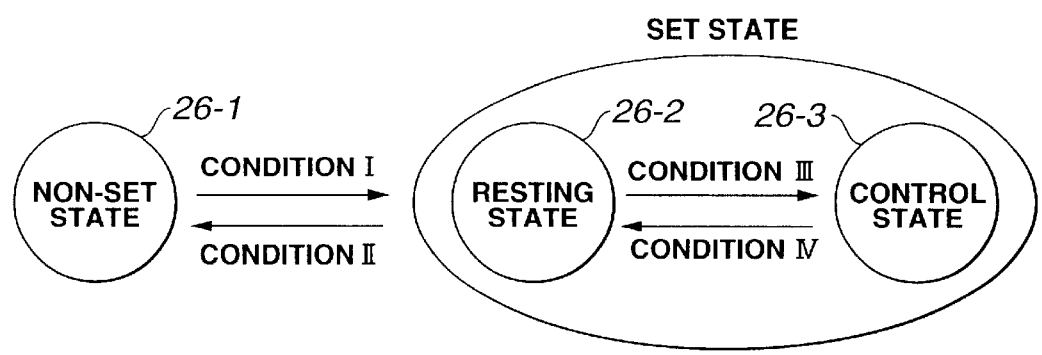
FIG. 25 is an explanatory view explaining a relationship of the control modes and conditions in an eighth embodiment.
Figure 26:
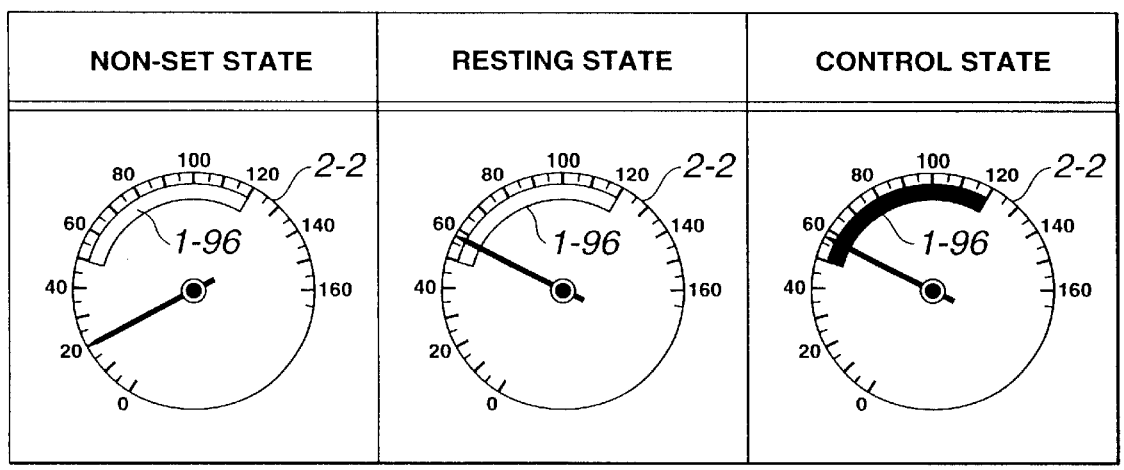
FIG. 26 is a view showing a content of a displayed speed range by each state in the eighth embodiment.

Referring to FIGS. 25 and 26, there is shown an eighth embodiment of the vehicle traveling control system with the state display apparatus according to the present invention. The eighth embodiment is arranged such that the traveling control section takes a non set state (control standby mode), a resting state (control rest mode) and a control state (traveling control mode) as a control mode, like as a lane keeping control for applying a torque to a steering so as to steer the host vehicle along a road lane upon recognizing lane marks by means of an image processing. Further, the display content determined section 1-8 is arranged such that the appearance of the speed range is changed in color, design or brightness according to the control mode which is selected from the control standby mode, the control rest mode and the traveling control mode, and is displayed on the speed range display section 1-96.

FIG. 25 shows the relationship among a non-set state 26-1, a resting state 26-2 and a control state 26-3 which are changed according to conditions I to IV.

When main switch $SW_M$ is turned on from an OFF state, the control mode is transited to non-set state 26-1. The resting state 26-2 is a condition that the control is temporally rested for reasons that the driver is manipulating the steering wheel under a condition that the control is set and no lane marker is recognized. The control state 26-3 is a condition that the control is executed when the control is set, when the lane marker is recognized and when the driver is not being manipulating the steering wheel.

The condition I is established when set switch $SW_S$ is pushed under a condition that the vehicle is traveling within a predetermined vehicle speed. By the establishment of the condition I, the mode is transited from the non-set state 26-1 to the set state including the resting state 26-2 and the control state 26-3.

The condition II is established when cancel switch $SW_C$ is pushed under the set state or when the brake pedal is increasingly depressed under the set state. By the establishment of the condition II, the mode is transited from the set state including the resting state 26-2 and the control state 26-3 to the non-set state 26-1.

The condition III is established when the lane marker is recognized and when the steering wheel is not manipulated by the driver and when winkers is inoperative. By the establishment of the condition III, the mode is transited form the resting state 26-2 to the control state 26-3.

The condition IV is established when the lane marker is not recognized under the control state 26-3 or when the driver manipulates at least one of the steering wheel and the winker. By the establishment of the condition IV, the mode is transited from the control state 26-3 to the resting state 26-2.

In this system of the eighth embodiment, in order to distinguish the resting state and the non-set state in both of which the control is not executed, the appearance (including color, brightness or design) of each of the set-condition speed range and the control-condition speed range is changed according to the non-set state, the resting state, and the control state. Accordingly, the driver can easily recognize the condition of the system.

NINTH EMBODIMENT

Figure 27:
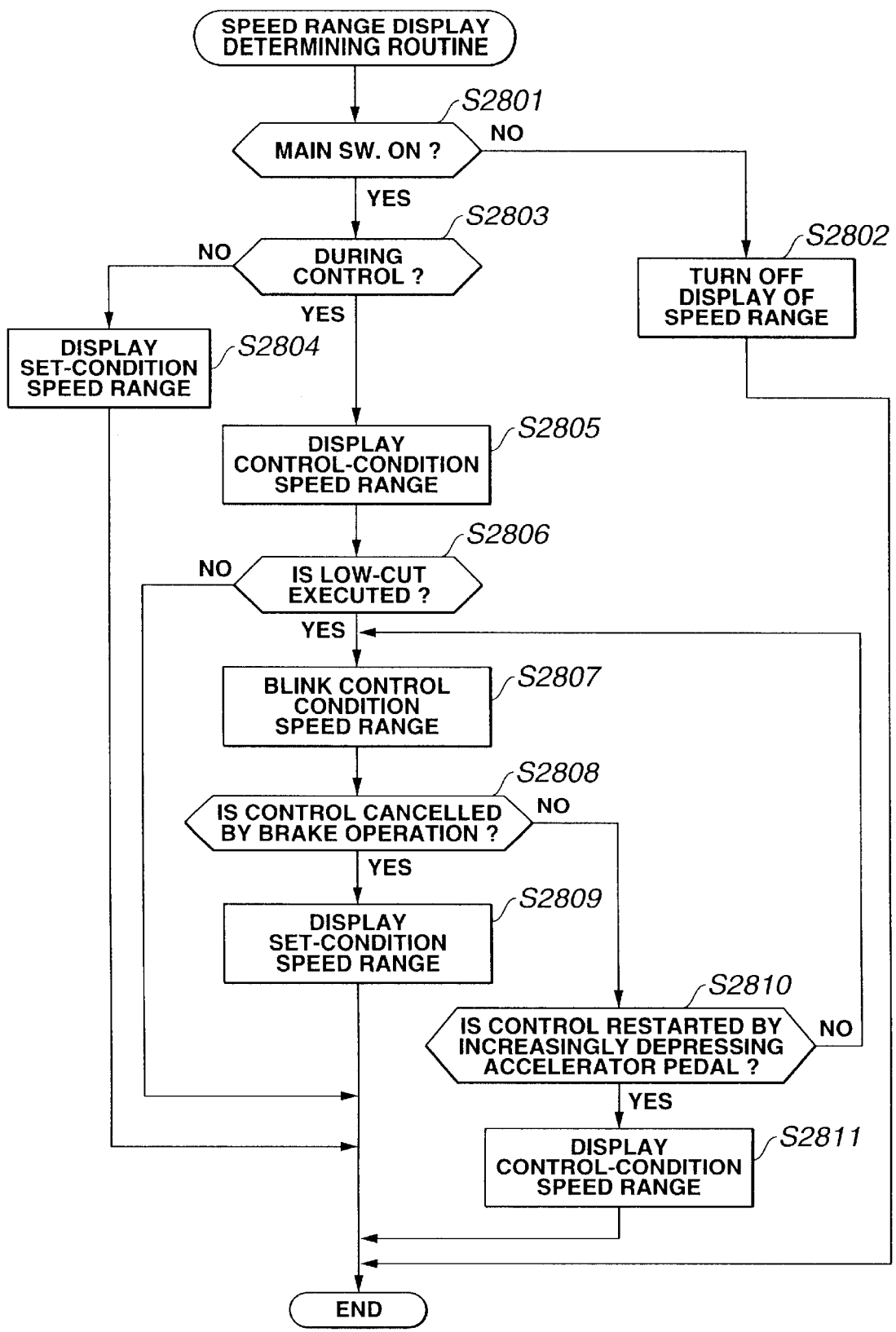
FIG. 27 is a flowchart showing a speed range display determining process in a ninth embodiment.
Figure 28:
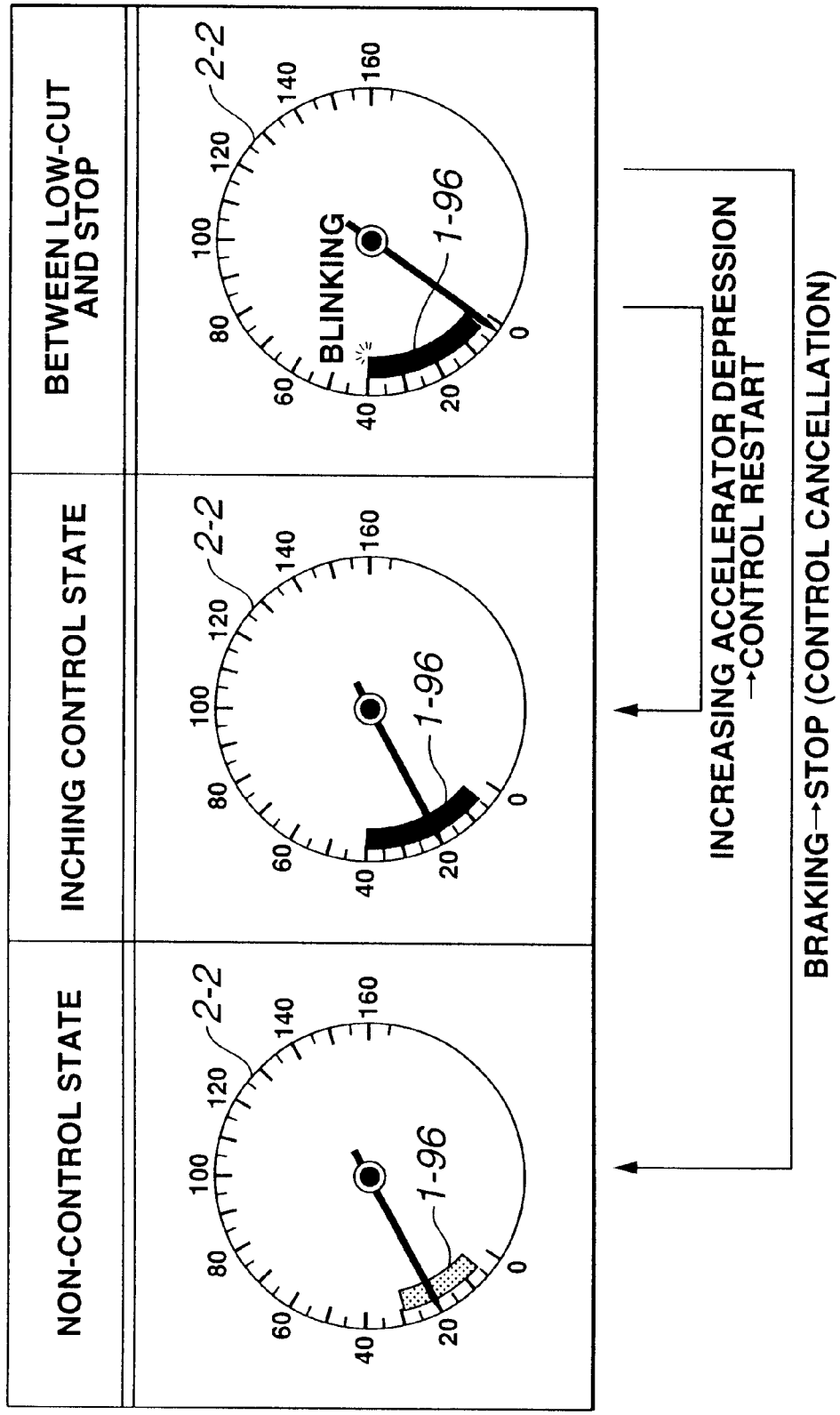
FIG. 28 is a view showing a content of a displayed speed range by each state in the ninth embodiment.

Referring to FIGS. 27 and 28, there is shown a ninth embodiment of the vehicle traveling control system with the state display apparatus according to the present invention. The ninth embodiment is arranged such that when the traffic-congestion following control is cancelled by lowering of the vehicle speed to a vehicle speed smaller than the controlled vehicle speed (low-cut) and when the vehicle speed is then increased within a control-condition speed range by increasingly depressing the accelerator pedal before the vehicle stops, the control is automatically restarted. Further, the display content determining section 1-8 of traveling controller 30 outputs a display command to the speed range display section 1-96 so as to blink the display of the control-condition speed range until the vehicle is stopped or the control is restarted or cancelled after the control is cancelled due to the low-cut of the vehicle speed.

Speed Range Content Determining Process

FIG. 27 shows a flowchart of the speed range display content determining process executed by the display content determining section 1-8 of traveling controller 30 employed in the ninth embodiment according to the present invention.

At step S2801, traveling controller 30 determines whether main switch $SW_M$ is turned on or not. When the determination at step S2801 is negative, the routine proceeds to step S2802 wherein controller 30 turns off the display of the speed range displayed on the speed range display section 1-96. Then, the routine proceeds to an end block to terminate the present routine. When the determination at step S2801 is affirmative, the routine proceeds to step S2803.

At step S2803, controller 30 determines whether the control is now being executed or not. When the determination at step S2803 is negative, the routine proceeds to step S2804 wherein controller 30 displays the set-condition speed range. Then, the routine proceeds to the end block. When the determination at step S2803 is affirmative, the routine proceeds to step S2805.

At step S2805, controller 30 displays (turns on) the control-condition speed range at the speed range display section 1-96.

At step S2806 subsequent to the execution of step S2805, controller 30 determines whether the low-cut is executed or not. When the determination at step S2806 is negative, the routine jumps to the end block. When the determination at step S2806 is affirmative, the routine proceeds to step S2807.

At step S2807, controller 30 commands the speed range display section 1-96 to blink the control-condition speed range.

At step S2808, controller 30 determines whether or not the control is cancelled due to the braking operation of the driver. When the determination at step S2808 is affirmative, the routine proceeds to step S2809. When the determination at step S2808 is negative, the routine proceeds to step S2810.

At step S2809 subsequent to the affirmative determination at step S2808, controller commands the speed range display section 1-96 to display the set-condition speed range. Then the routine proceeds to the end block.

At step S2810 subsequent to the negative determination at step S2808, controller 30 determines whether or not the control is restarted due to the increasing depressing of the accelerator pedal by the driver. When the determination at step S2810 is affirmative, the routine proceeds to step S2811 wherein controller 30 commands speed range display section 1-96 to display the control-condition speed range. Then, the routine proceeds to the end block. When the determination at step S2810 is negative, the routine returns to step S2807.

Speed Range Display Function

When main switch $SW_M$ is pushed and when set switch $SW_S$ is not pushed, the routine of FIG. 27 proceeds in the order of step S2801→step S2803→step S2804. As shown by the indication of non-control state of FIG. 28, the set-condition speed range is displayed on the speed range display section 1-96 of speedometer 2—2.

When main switch $SW_M$ is pushed and when the low-cut of the vehicle speed is not executed during the control where set switch $SW_S$ is pushed, the routine of FIG. 27 proceeds in the order of step S2801→step S2803→step S2805→step S2806→End block. Accordingly, the control-condition speed range is displayed on the speed range display section 1-96 of speedometer 2—2 while changing its appearance different from that in the non-control state, as shown by the indication of the inching control state of FIG. 28.

When main switch $SW_M$ is pushed and when the low-cut is executed during the control where set switch $SW_S$ is pushed, the routine of FIG. 27 proceeds in the order of step S2801→step S2803→step S2805→step S2806→step S2806→step S2807.

Accordingly, the control-condition speed range is displayed while blinking on the speed range display section 1-96 of speedometer 2—2, as shown by the indication of the state between low-cut and stop in FIG. 28.

When the control is canceled in reply to the braking operation after the low-cut is executed, the routine of FIG. 27 proceeds in the order of step S2801→step S2803→step S2805→step S2806→step S2807→step S2808→step S2809. Accordingly, the display content of the speed range is changed from the blinking display of the control-condition speed range to the display of the set-condition speed range during the non-control state.

When the control is restarted by the increasing depression of the accelerator pedal after the low-cut is executed, the routine of FIG. 27 proceeds in the order of step S2801→step S2803→step S2805→step S2806→step S2807→step S2808→step S2810→step S2811. Accordingly, the display content of the speed range is changed from the blinking display of the speed range corresponding to a period between the low-cut and the vehicle stop to the control-condition speed range during the inching control.

Therefore, with the thus arranged state display apparatus of the vehicle traveling control system of the ninth embodiment, during a period from a moment when the control is cancelled due to the low-cut of the vehicle speed to a moment when the vehicle is stopped or when the control is restarted or cancelled, the appearance of the display of the speed range is blinked so as to be different from the appearance of the normal display. Therefore, the driver can recognize the control condition inherent in the traffic-congestion following control system in that the control may be automatically restarted even when the low-cut is executed.

TENTH EMBODIMENT

Figure 29:
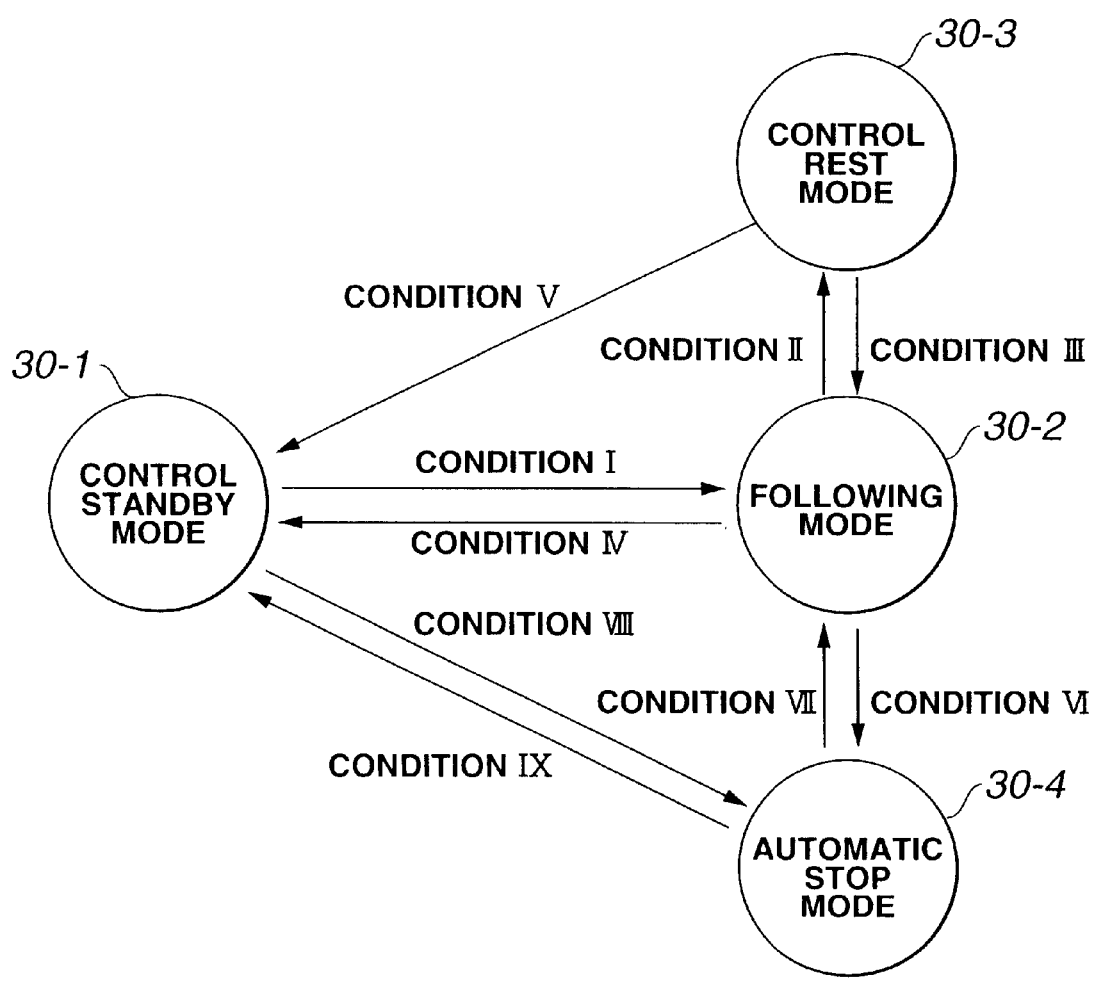
FIG. 29 is an explanatory view explaining a relationship of the control mode and conditions in a tenth embodiment.
Figure 30:
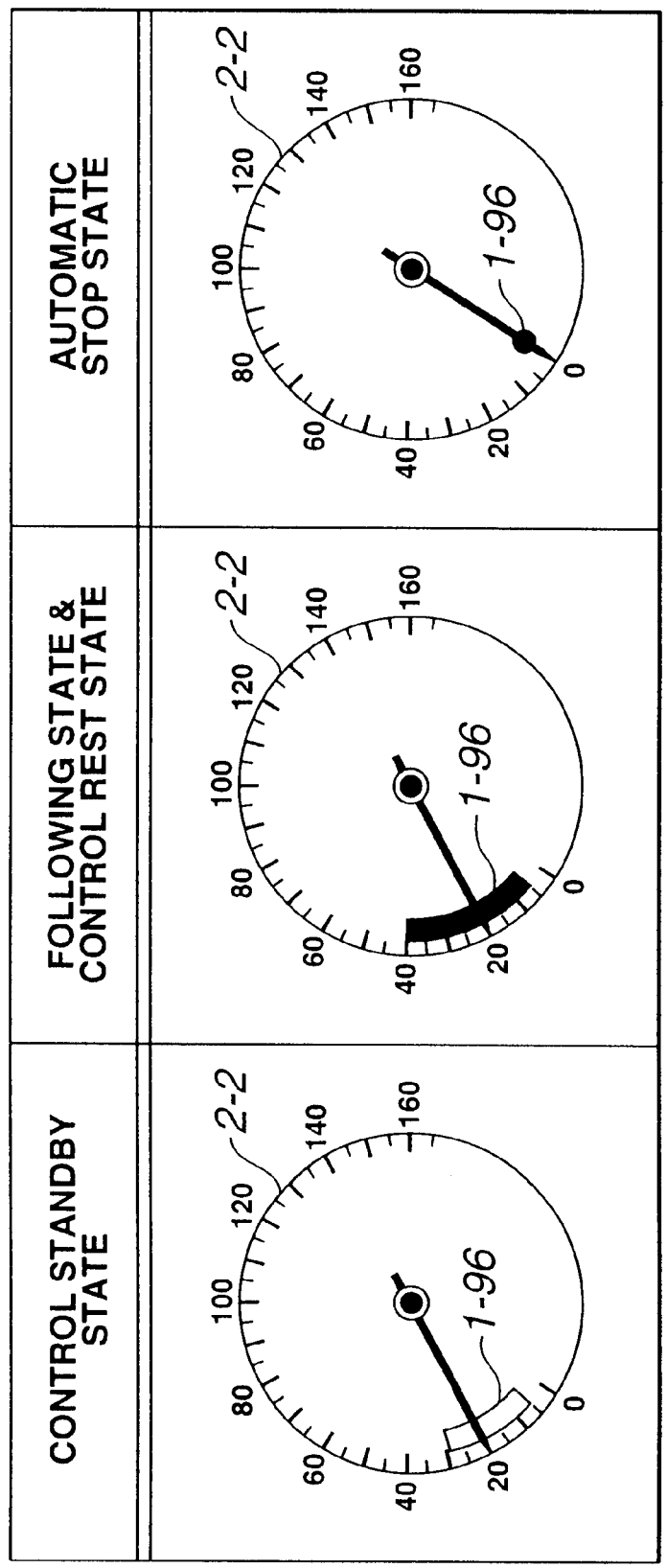
FIG. 30 is a view showing a content of a displayed speed range by each state in the tenth embodiment.
Figure 31:
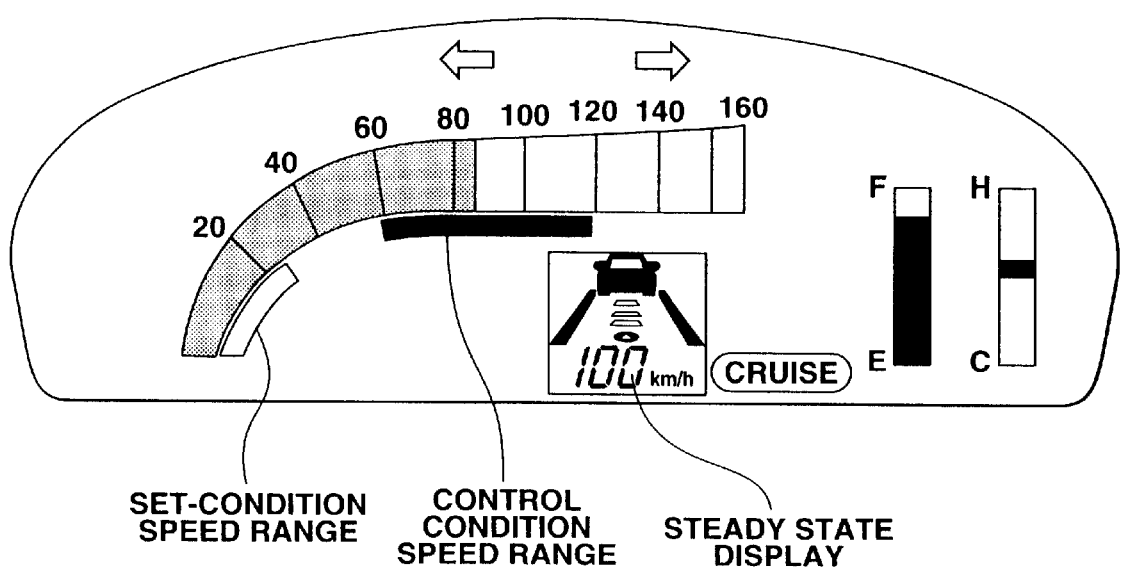
FIG. 31 is a view showing a digital type speedometer to which the control condition information is displayed.

Referring to FIGS. 29 and 30, there is shown a tenth embodiment of the vehicle traveling control system with the state display apparatus according to the present invention. In the tenth embodiment according to the present invention, the traffic-congestion following control system is arranged such that the inter-vehicle distance control is executed until the extremely low speed and that the vehicle is stopped by the control when a preceding vehicle is stopped and that the restart of the following control subsequent to the temporal stop of the vehicle is achieved by the driver's operation. Further, the display content determining section 1-8 is arranged to display the set-condition speed range and the control-condition speed range and to command the speed range display section 1-96 to display only the speed corresponding to 0 km/h during when the vehicle is stopped by the control.

Mode Transition Function

FIG. 29 shows a transition relationship among the control modes of the control content determining section 1-5.

Control standby mode 30-1 is selected when main switch $SW_M$ is turned on from an OFF state.

Following mode 30-2:

Traveling controller 30 calculates the command throttle opening and/or the command brake fluid pressure so as to bring the measured inter-vehicle distance L to the target inter-vehicle distance L* when the control system recognizes a preceding vehicle. Traveling controller 30 calculates the command throttle opening and/or the command brake fluid pressure so as to bring the measured vehicle speed closer to the target vehicle speed when the system recognizes no preceding vehicle.

Control rest mode 30-3:

Following mode 30-2 is stopped, and the accelerating operation of the driver is executed prior to the traveling control (acceleration override during the control state) when the driver depresses the accelerator pedal during the following mode.

Automatic stop mode 30-4:

Traveling controller 30 controls the brake fluid pressure at a predetermined fluid pressure in order to keep the vehicle stop condition.

One of these four control modes is executed according to the following transition conditions I to IX.

Condition I is established when set switch $SW_S$ is pushed under a condition that the vehicle is traveling within a predetermined vehicle speed in D range. By the establishment of the condition I, the control mode is transited from control standby mode 30-1 to following mode 30-2.

Condition II is established when the accelerator pedal is depressed under a condition of following mode 30-2. By the establishment of the condition II, the control mode is transited from following mode 30-2 to control rest mode 30-3.

Condition III is established when the accelerator pedal is increasingly depressed during control rest mode 30-3. By the establishment of the condition III, the control mode is transited from control rest mode 30-3 to following mode 30-2.

Condition IV is established when cancel switch $SW_C$ is pushed during the following mode. By the establishment of the condition IV, the control mode is transited from following mode 30-2 to control standby mode 30-1.

Condition V is established when cancel switch $SW_C$ is pushed, shifting operation is executed or the vehicle speed becomes greater than a predetermined speed under a condition that the vehicle is accelerated during the control rest mode. By the establishment of the condition V, the control mode is transited from control rest mode 30-3 to control standby mode 30-1.

Condition VI is established when the inter-vehicle distance to a preceding vehicle is smaller than a predetermined value and the vehicle speed is lower than or equal to a predetermined speed, or when traveling controller 30 loses the preceding vehicle during a traveling at a speed lower than or equal to the predetermined speed. By the establishment of the condition VI, the control mode is transited from automatic stop mode 30-4 to the following mode 30-2.

Condition VII is established when the vehicle speed becomes greater than the predetermined value by increasingly depressing accelerator pedal 14 under a condition that the vehicle stop condition is maintained by the control. By the establishment of condition VII, the control mode is transited from automatic stop mode 30-4 to following mode 30-2.

Condition VIII is established when set switch $SW_S$ is pushed under a condition that the brake pedal is not depressed during D range, such as when the vehicle is stopping by the parking brake activation, or when the vehicle inches at an extremely low speed lower than a predetermined speed. By the establishment of the condition VIII, the control mode is transited from the control standby mode 30-1 to the automatic stop mode 30-4.

Condition IX is established when cancel switch $SW_C$ is pushed during the automatic stop or when the shift operation is executed or the brake pedal is increasingly depressed. By the establishment of the condition IX, the control mode is transited from the automatic stop mode 30-4 to the control standby mode 30-1.

Speed Range Display Function

When control standby mode 30-1 is executed, that is, when the main switch $SW_M$ is pushed and when set switch $SW_S$ is not pushed, the set-condition speed range is displayed at the speed range display section 1-96 of speedometer 2—2, as shown by the control standby state of FIG. 30.

When following mode 30-2 or control rest mode 30-3 is executed, that is, when both of main switch $SW_M$ and set switch $SW_S$ are pushed, the set-condition speed range is displayed at the speed range display section 1-96 of speedometer 2—2 while changing its appearance so as to be different from the appearance of the control rest state, as shown by the following control state or the control rest state of FIG. 30.

On the other hand, when automatic stop mode 30-4 is executed, a point corresponding to 0 km/h of speedometer 2—2 is displayed as shown by the automatic stop state of FIG. 30.

Therefore, with the tenth embodiment of the state display apparatus of the vehicle traveling control system, which is arranged such that the point corresponding to 0 km/h is displayed when automatic stop mode 30-4 is executed, the driver can easily recognize that the vehicle is stopped in reply to the stop of the preceding vehicle and this stop of the host vehicle is inherent in the control state of the traffic-congestion following control system.

Although the invention has been described above by reference to certain embodiments of the invention, the invention is not limited to the embodiments described above. Modifications and variations of the embodiments described above will occur to those skilled in the art, in light of the above teaching. For example, although the first to tenth embodiments have been shown and described such that speedometer 2—2 is of an analog type, a digital type speedometer shown in FIG. 30 may be employed instated of speedometer 2—2. The digital type speedometer of FIG. 30 is arranged to comprise a low speed ranged display section, a high speed range display section and a steady-state display section and to display a speed range of the set condition at the low speed range display section and to display the control-condition speed range at the high-speed range display section so as to be different from the low-speed range display section in appearance.

The entire contents of Japanese Patent Application No. 2001-78370 filed on Mar. 19, 2001 in Japan are incorporated herein by reference.

The scope of the invention is defined with reference to the following claims.

What is claimed is:

1. A vehicle traveling control system, comprising:
   a control setting unit (1—1, 1-4, $SW_M$, $SW_S$) for setting a vehicle traveling control;
   a speed range display (1-9) disposed along a scale of a speedometer;
   a controller (30, 1-10) coupled with the control setting unit and the speed range display, the controller being arranged
      to execute the vehicle traveling control according to a setting operation of the control setting unit,
      to command the speed range display to display a set-condition speed range wherein a setting operation of a vehicle traveling control is allowed, when the vehicle traveling control is not set,
      to command the speed range display to display a control-condition speed range wherein a continuation of the vehicle traveling control is allowed, when the vehicle traveling control is set.

2. A vehicle traveling control system with a state display apparatus, comprising:
   a control setting unit (1—1, 1-4, $SW_M$, $SW_S$) for setting a vehicle traveling control;
   a speed-range display (1-9) disposed along a scale of a speedometer of a host vehicle;
   a controller (30, 1-10) executing the vehicle traveling control according to a setting operation of the control setting unit;
   the controller executing an inter-vehicle distance control for following a preceding vehicle so that an inter-vehicle distance between the preceding vehicle and the host vehicle is brought closer to a target inter-vehicle distance while a vehicle speed is maintained within a target vehicle speed when the vehicle traveling control is executed and when there is the preceding vehicle ahead of the host vehicle;
   the controller executing a cruise control so that a vehicle speed of the host vehicle is brought closer to a set vehicle speed set by the control setting unit when the vehicle traveling control is executed and when there is no preceding vehicle ahead of the host vehicle;

the controller commanding the speed-range display to display a first speed range indicative of a setting enabling range when the vehicle traveling control is not set;

the controller commanding the speed-range display to display a second speed range indicative of a variable range of a set vehicle speed when the vehicle traveling control is set;

the controller commanding the speed-range display to display a third speed range indicative of an upper-extended control continued range when the vehicle traveling control is set and when the vehicle speed is greater than the set vehicle speed due to a vehicle accelerating operation by a driver;

the controller commanding the speed-range display to change a displayed speed range from the third speed range to the second speed range when the vehicle accelerating operation by the driver is terminated and when the vehicle speed is smaller than a maximum value of the variable range of the set vehicle speed;

the controller commanding the speed-range display to display a fourth speed range indicative of a lower-extended control continued range when the inter-vehicle distance control is executed and when vehicle speed is smaller than a first predetermined value; and the controller commanding the speed-range display to change the displayed speed range from the fourth speed range to the second speed range when the vehicle speed is greater than a second predetermined value which is greater than the first predetermined value.

3. The vehicle traveling control system as claimed in claim 1, wherein the controller commands the speed range display to display a mark indicative of the set vehicle speed and marks indicative of settable set vehicle speeds.

4. The vehicle traveling control system as claimed in claim 1, wherein the controller executes a high-speed range traveling control operative in a high-speed range and a low-speed range traveling control operative in a low-speed range, the speed range display comprising a high-speed range display section which displays a high-speed range where the high-speed range traveling control is capable of being executed and a low-speed range display section which displays a low-speed range where the low-speed range traveling control is capable of being executed.

5. The vehicle traveling control system as claimed in claim 4, wherein the high-speed range display section and the low-speed range display section are offset so that a lower limit of the displayed range of the high speed range display section is distinguished from an upper limit of the displayed range of the low-speed range display section even when a part of a displayed range of the high-speed range display section is overlapped with a part of a displayed range of the low-speed range display section.

6. The vehicle traveling control system as claimed in claim 4, wherein the controller commands the speed range display section to stop displaying the set-condition speed range when one of the high-speed range traveling control and the low-speed range traveling control is being executed and when the control-condition speed range of the one of the high-speed range traveling control and the low-speed range traveling control is overlapped with a set-condition speed range of the other of the high-speed range traveling control and the low-speed range traveling control.

7. The vehicle traveling control system as claimed in claim 4, wherein the controller commands the speed range display to differentiate at least one of color, design and brightness of one of the high-speed range display section and the low-speed range display section from that of the other according to operating conditions of the high-speed range traveling control and the low-speed range traveling control.

8. The vehicle traveling control system as claimed in claim 1, wherein the controller selects one of a control standby mode, a control rest mode and a control execution mode with respect to the vehicle traveling control, the controller commanding the speed range display to change at least one of color, design and brightness of a displayed speed range according to a selection of the control standby mode, the control rest mode and the control execution mode.

9. The vehicle traveling control system as claimed in claim 2, wherein the controller executes a low-speed range traveling control operative in a low-speed range, the low-speed range traveling control including a low-speed range inter-vehicle distance control which is restarted when the vehicle speed is increased within a control-condition speed range of the low-speed range inter-vehicle distance control after the vehicle speed becomes a value which is greater than 0 km/h and is smaller than a lower limit of the control-condition speed range, the controller commanding the speed range display to change an appearance of the displayed speed range after the low-speed range inter-vehicle distance control is canceled due to lowering of the vehicle speed outside of the control-condition speed range and until one of vehicle stop, restart of the low-speed range inter-vehicle distance control and cancellation of the low-speed range inter-vehicle distance control is achieved.

10. The vehicle traveling control system as claimed in claim 2, wherein the controller executes a low-speed range traveling control operative in a low-speed range, the low-speed traveling control including a low-speed range inter-vehicle distance control which stops the host vehicle when a preceding vehicle is stopped and which is canceled when the host vehicle is stopped, restart of the low-speed range inter-vehicle distance control being executed by manipulating the control setting unit, the controller commanding the speed range display to display only a point corresponding to 0 km/h during a period that the vehicle is stopped by the low-speed range inter-vehicle distance control.

11. A state display apparatus of a vehicle traveling control system, comprising:

a speed range display disposed along a scale of a speedometer;

a controller coupled with the speed range display, the controller being arranged to command the speed range display to display a set-condition speed range indicative of a speed range wherein a setting of a vehicle traveling control is allowed, when the vehicle traveling control by the vehicle traveling control system is not set, to command the speed range display to display a control-condition speed range wherein a continuation of the vehicle traveling control is allowed, when the vehicle traveling control is set.

12. A vehicle traveling control system, comprising:

control setting means for setting a vehicle traveling control;

speed range displaying means for displaying a speed range along a scale of a speedometer;

travel controlling means for executing the vehicle traveling control according to the setting by the control setting means, display content determining means for informing a vehicle control condition to a driver, the display content determining means commanding the speed range displaying means to display a traveling control settable speed range when the vehicle traveling control is not set, the display content determining means commanding the speed range displaying means to display a traveling control maintainable speed range when the vehicle traveling control is set.

13. A method of displaying a state of a vehicle traveling control, comprising:

displaying a first speed range indicative of a traveling control settable speed range when the vehicle traveling control is not set; and displaying a second speed range indicative of a traveling control maintainable speed range when the vehicle traveling control is set.

* * * * *